US012781072B2

(12) United States Patent
Asakawa et al.

(10) Patent No.: US 12,781,072 B2
(45) Date of Patent: Nov. 3, 2026

(54) INKJET INK COMPOSITION AND RECORDING METHOD

(71) Applicants: SEIKO EPSON CORPORATION, Tokyo (JP); MITSUI CHEMICALS, INC., Tokyo (JP)

(72) Inventors: Yuta Asakawa, Azumino (JP); Keigo Ando, Matsumoto (JP); Akira Mizutani, Matsumoto (JP); Tomotaka Matsumoto, Sapporo (JP); Yasuyuki Kagawa, Ichihara (JP)

(73) Assignees: SEIKO EPSON CORPORATION (JP); MITSUI CHEMICALS, INC. (JP)

( * ) Notice: Subject to any disclaimer, the term of this patent is extended or adjusted under 35 U.S.C. 154(b) by 186 days.

(21) Appl. No.: 18/616,363

(22) Filed: Mar. 26, 2024

(65) Prior Publication Data

US 2024/0327663 A1 Oct. 3, 2024

(30) Foreign Application Priority Data

Mar. 27, 2023 (JP) ................................ 2023-050497

(51) Int. Cl.
*C09D 11/322* (2014.01)
*B41M 7/00* (2006.01)
(Continued)

(52) U.S. Cl.
CPC ........... *C09D 11/322* (2013.01); *B41M 7/009* (2013.01); *C09D 11/033* (2013.01); *C09D 11/107* (2013.01); *C09D 11/38* (2013.01)

(58) Field of Classification Search
CPC ..... C09D 11/322; C09D 11/033; C09D 11/30; C09D 11/107; C09D 11/38; B41M 7/009
See application file for complete search history.

(56) References Cited

U.S. PATENT DOCUMENTS

2009/0297713 A1* 12/2009 Ito ........................ C09D 11/322 524/588
2016/0251528 A1* 9/2016 Mizutani ................ C09D 11/10 347/20
(Continued)

FOREIGN PATENT DOCUMENTS

EP 2940085 B1 * 9/2020 ........... C09D 11/107
JP 2017-203077 A 11/2017

OTHER PUBLICATIONS

'2-Pyrrolidone' [Online], Drugfuture.com, Apr. 15, 2018, Use [retrieved on Mar. 19, 2026]. Retrieved from the Internet: <URL:https://www.drugfuture.com/chemdata/2-Pyrrolidone.html> (Year: 2018).*

*Primary Examiner* — Douglas X Rodriguez
*Assistant Examiner* — Kyra Melor Van Kreuningen
(74) *Attorney, Agent, or Firm* — Harness, Dickey & Pierce, P.L.C.

(57) ABSTRACT

The inkjet ink composition is an aqueous ink including: a coloring material; resin particles; and a water-soluble low-molecular weight organic compound. The water-soluble low-molecular weight organic compound contains 0.5 mass % to 9.0 mass % of an amide having a normal boiling point of from 215° C. to 290° C. with respect to a total mass of the ink composition. The resin particles are composite resin particles each formed of a first resin and a second resin that are acrylic resins. When a root sum square δph of each of the first resin and the second resin is calculated from $\delta ph=\sqrt{(\delta p^2+\delta h^2)}$ where δp and δh represent a polar component and a hydrogen-bonding component of Hansen solubility parameters thereof, respectively, a δph1 of the first resin is from 4.0 $MPa^{1/2}$ to 4.8 $MPa^{1/2}$, and a δph2 of the second resin is more than 2.6 $MPa^{1/2}$ and less than 3.7 $MPa^{1/2}$.

15 Claims, 1 Drawing Sheet

(51) Int. Cl.
*C09D 11/033* (2014.01)
*C09D 11/107* (2014.01)
*C09D 11/38* (2014.01)

(56) References Cited

U.S. PATENT DOCUMENTS

| | | | | |
|---|---|---|---|---|
| 2018/0346742 | A1* | 12/2018 | Sato | C09D 11/30 |
| 2019/0218405 | A1* | 7/2019 | Seguchi | C09D 11/033 |
| 2020/0198358 | A1* | 6/2020 | Uchida | C09D 11/322 |
| 2021/0009826 | A1* | 1/2021 | Kizaki | C09D 11/322 |
| 2022/0064472 | A1* | 3/2022 | Asakawa | C09D 11/322 |

* cited by examiner

INKJET INK COMPOSITION AND RECORDING METHOD

The present application is based on, and claims priority from JP Application Serial Number 2023-050497, filed Mar. 27, 2023, the disclosure of which is hereby incorporated by reference herein in its entirety.

BACKGROUND

1. Technical Field

The present invention relates to an inkjet ink composition and a recording method.

2. Related Art

An inkjet recording method has been achieving rapid development in various fields because the method enables the recording of a high-definition image with a relatively simple apparatus. Along with the innovative advancement of an inkjet recording system technology in recent years, a printing method including using an inkjet recording system has started to be utilized in the field of high-definition image recording in which photography or offset printing has heretofore been used. In particular, various proposals have been made on an ink with which a high-quality image can be recorded on an ink non-absorbing or low-absorbing recording medium.

Incidentally, the image recorded on the ink non-absorbing or low-absorbing recording medium may be unable to obtain sufficient abrasion resistance because a coloring material hardly permeates into the recording medium. Accordingly, an investigation has been made on an attempt to improve the abrasion resistance through the addition of resin particles for forming a coating film on the surface of the image to the ink (see, for example, JP-A-2017-203077).

However, resin particles to be incorporated into an ink composition generally have such properties as to be liable to stick because the particles are intended to form a coating film on the surface of an image. In the case where the resin particles in the ink composition stored in an inkjet head are dissolved once to stick to, for example, the wall surface of the inkjet head, there has occurred a problem in that even when nozzle cleaning is performed, the ink cannot be normally ejected, and hence clogging recoverability reduces. That is, there is a trade-off relationship between the clogging recoverability of a nozzle and the abrasion resistance of an image.

Accordingly, there have been required an inkjet ink composition (hereinafter also simply referred to as "ink composition"), which improves the abrasion resistance of an image recorded on a recording medium, and also improves the clogging recoverability of an inkjet head nozzle, and a recording method including using the ink composition.

SUMMARY

According to a first aspect of the present disclosure, there is provided an inkjet ink composition, which is an aqueous ink including: a coloring material; resin particles; and a water-soluble low-molecular weight organic compound. The water-soluble low-molecular weight organic compound contains 0.5 mass % to 9.0 mass % of an amide having a normal boiling point of from 215° C. to 290° C. with respect to a total mass of the ink composition. The resin particles are composite resin particles each formed of a first resin and a second resin that are acrylic resins. When a root sum square δph of each of the first resin and the second resin is calculated from $\delta ph=\sqrt{(\delta p^2+\delta h^2)}$ where δp and δh represent a polar component and a hydrogen-bonding component of Hansen solubility parameters thereof, respectively, a δph1 of the first resin is from 4.0 $MPa^{1/2}$ to 4.8 $MPa^{1/2}$, and a δph2 of the second resin is more than 2.6 $MPa^{1/2}$ and less than 3.7 $MPa^{1/2}$.

According to a second aspect of the present disclosure, there is provided a recording method, including an ink adhesion step of ejecting the inkjet ink composition of the one aspect from an inkjet head to cause the composition to adhere to a recording medium.

DESCRIPTION OF EXEMPLARY EMBODIMENTS

Figure 1:
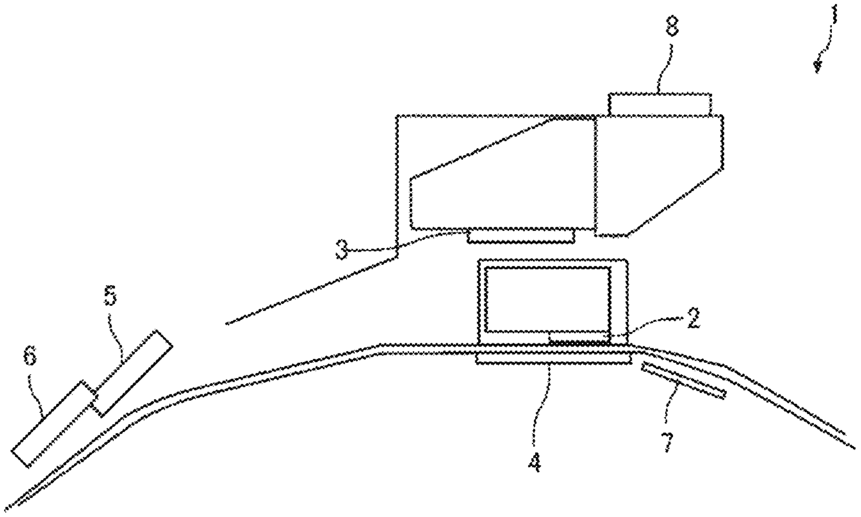
FIG. 1 is a schematic sectional view for schematically illustrating an inkjet recording apparatus.

Embodiments of the present invention are described below. The embodiments described below describe examples of the present invention. The present invention is by no means limited to the following embodiments, and encompasses various modifications performed within the scope that does not change the gist of the present invention. Not all of the configurations described below should necessarily be taken as essential configurations of the present invention. The term "(meth)acrylic acid~" as used herein means "acrylic acid~" or "methacrylic acid~." In addition, the term "~(meth)acrylate" means "~acrylate" or "~methacrylate."

1. Inkjet Ink Composition

An inkjet ink composition according to at least one embodiment of the present disclosure is an aqueous ink including: a coloring material; resin particles; and a water-soluble low-molecular weight organic compound. The water-soluble low-molecular weight organic compound contains 0.5 mass % to 9.0 mass % of an amide having a normal boiling point of from 215° C. to 290° C. with respect to a total mass of the ink composition. The resin particles are composite resin particles each formed of a first resin and a second resin that are acrylic resins. When a root sum square δph of each of the first resin and the second resin is calculated from $\delta ph=\sqrt{(\delta p^2+\delta h^2)}$ where δp and δh represent a polar component and a hydrogen-bonding component of Hansen solubility parameters thereof, respectively, a δph1 of the first resin is from 4.0 $MPa^{1/2}$ to 4.8 $MPa^{1/2}$, and a δph2 of the second resin is more than 2.6 $MPa^{1/2}$ and less than 3.7 $MPa^{1/2}$.

In a nozzle in which misfiring has occurred owing to, for example, air bubbles in an inkjet head, the ink composition stays in a pressure chamber to receive heat from a platen or the like, and hence its drying advances. Thus, there occurs a problem in that the resins for forming the resin particles in the ink composition are dissolved in the inkjet head to be welded thereto, to thereby cause clogging. For example, resin welding on a nozzle plate can be removed by wiping, but the clogging due to the resin welding in the inkjet head cannot be solved by the wiping in some cases. In addition, the clogging due to the resin welding in the inkjet head can be solved by suction cleaning to some extent, but cannot be solved by flushing in some cases. In such cases, the performance of the suction cleaning for solving the clogging due to the resin welding in the inkjet head is disadvantageous in terms of recording productivity because printing may be interrupted by the suction cleaning.

This time, the inventors of the present application have found that the use of the composite resin particles as resins for forming a coating film on a recording medium can improve both of the clogging recoverability of a nozzle and the abrasion resistance of an image. Each of the composite resin particles includes, for example, one resin and the other resin, and has a structure in which the one resin is included in the other resin. While the one resin present inside each of the composite resin particles is hardly brought into contact with a component in the ink, which dissolves a resin, such as an organic solvent in the ink, the other resin present outside the composite resin particle is easily brought into contact with the organic solvent in the ink. At this time, when the other resin present outside is hardly soluble in the organic solvent, the resin particles can be suppressed from being dissolved in the inkjet head to cause clogging. In addition, when the one resin present inside is easily soluble in the organic solvent, the resin particles are deformed by heating or the like after their adhesion to the recording medium, and hence the one resin is discharged from the inside to the outside to be brought into contact with the organic solvent or the like. Thus, the resin particles are sufficiently dissolved to smooth an ink film, and hence the abrasion resistance of a recorded product is improved. In addition, an amide having a high resin-dissolving property is suitable as the organic solvent or the like to be used together with the composite resin particles.

However, the amide is hardly dried after the adhesion of the ink to the recording medium, and hence has involved a problem in that the amide is not sufficiently dried in a post-heating step, and hence the abrasion resistance of the recorded product deteriorates. Alternatively, the sufficient drying of the amide has required the performance of the post-heating step for a long time period or at high temperatures. Meanwhile, the drying property of the ink can be improved by reducing the content of the amide in the organic solvent or the like to be incorporated into the ink. However, related-art composite resin particles are hardly soluble in such organic solvent or the like, and hence have not been sufficient yet in terms of facilitation of the dissolution of the resin particles after the adhesion to the recording medium. Accordingly, it is desired that even when the content of the amide in the organic solvent or the like is small, the other resin present outside each of the composite resin particles be made hardly soluble in the organic solvent, and the one resin present inside the composite resin particle be made easily soluble in the organic solvent.

Herein, it is conceivable that the design of each of the resin particles is changed by using Hansen solubility parameters serving as indices of the solubility of a material component. However, it has been impossible to sufficiently control the solubility of each of the composite resin particles in the organic solvent through the conventional design based on HSP values. More specifically, in conventional Hansen solubility parameters (HSP values), a polar component δp, a hydrogen-bonding component δh, and a dispersion component δd are used. However, when the composite resin particles are designed in consideration of those three components, it has been impossible to achieve preferred performance.

In view of the foregoing, the inventors of the present application have made extensive investigations, and as a result, have revealed that the dispersion component δd has low relevance to the solubility in the organic solvent, and hence design in consideration of the component does not provide preferred performance. The inventors have paid attention to the polar component δp and the hydrogen-bonding component δh out of the Hansen solubility parameters, and have newly found that preferred composite resin particles are obtained through design based on the root sum square δph of these components (i.e., $\delta ph=\sqrt{(\delta p^2+\delta h^2)}$).

That is, according to the inkjet ink composition of this embodiment, the δph1 of one resin in each of the composite resin particles is set to from 4.0 $MPa^{1/2}$ to 4.8 $MPa^{1/2}$, and the δph2 of the other resin therein is set to more than 2.6 $MPa^{1/2}$ and less than 3.7 $MPa^{1/2}$. Thus, even when the content of the amide having a normal boiling point of from 215° C. to 290° C. is small, the other resin can be made hardly soluble therein, and the one resin can be made easily soluble therein. Accordingly, the abrasion resistance of an image recorded on a recording medium is improved, and the clogging recoverability of an inkjet head nozzle is improved.

The amide having a normal boiling point of from 215° C. to 290° C. is also referred to as "specific amide."

The inventors have assumed that the δph1 of the one resin is closer to the δph of the specific amide than the δph2 of the other resin is, and hence the other resin can be made hardly soluble, and the one resin can be made easily soluble.

With regard to the specific amide, for example, 2-pyrrolidone has a δph of 15.1 $MPa^{1/2}$ and ε-caprolactam has a δph of 14.4 $MPa^{1/2}$. The specific amide preferably has a δph of from 10.0 $MPa^{1/2}$ to 18.0 $MPa^{1/2}$.

The respective components of the inkjet ink composition according to this embodiment are described in detail below.

1.1 Coloring Material

The inkjet ink composition according to this embodiment includes the coloring material. The coloring material is, for example, a pigment or a dye, but is not particularly limited thereto.

Pigment

Of the above-mentioned coloring materials, the pigment is not only insoluble or hardly soluble in water but also has such a property as to be hardly discolored even by light, a gas, or the like. Accordingly, a recorded product recorded with an ink using the pigment is satisfactory in water resistance, gas resistance, lightfastness, and storage stability. An inorganic pigment and an organic pigment may each be used as the pigment. Of those, at least one of carbon black belonging to the inorganic pigment or the organic pigment is preferred because such pigment has satisfactory color developability, and has a small specific gravity and hence hardly sediments at the time of its dispersion.

Examples of the inorganic pigment include, but not particularly limited to, carbon black, iron oxide, and titanium oxide.

Examples of the carbon black include, but not particularly limited to, furnace black, lamp black, acetylene black, and channel black (C.I. Pigment Black 7). In addition, examples of commercial products of the carbon black include No. 2300, No. 900, MCF88, No. 20B, No. 33, No. 40, No. 45, No. 52, MA7, MA8, MA100, and No. 2200B (all of which are product names, manufactured by Mitsubishi Chemical Corporation), Color Black FW1, FW2, FW2V, FW18, FW200, S150, S160, and S170, Printex 35, U, V, and 140U, and Special Black 6, 5, 4A, 4, and 250 (all of which are product names, manufactured by Degussa AG), Conductex SC, and Raven 1255, 5750, 5250, 5000, 3500, 1255, and 700

(all of which are product names, manufactured by Columbian Carbon Japan Ltd.), and Regal 400R, 330R, and 660R, Mogul L, Monarch 700, 800, 880, 900, 1000, 1100, 1300, and 1400, and Elftex 12 (all of which are product names, manufactured by Cabot Corporation).

Examples of the organic pigment include, but not particularly limited to, a quinacridone-based pigment, a quinacridonequinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, and an azo-based pigment. Specific examples of the organic pigment include the following pigments.

Examples of the pigment to be used in a cyan ink include C.I. Pigment Blue 1, 2, 3, 15, 15:1, 15:2, 15:3, 15:4, 15:6, 15:34, 16, 18, 22, 60, 65, and 66, and C.I. Vat Blue 4 and 60.

Examples of the pigment to be used in a magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264, and C.I. Pigment Violet 19, 23, 32, 33, 36, 38, 43, and 50.

Examples of the pigment to be used in a yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

In addition, examples of the pigment to be used in color inks other than the cyan, magenta, and yellow inks include, but not particularly limited to, C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

Examples of the pigment to be used in a white ink include white inorganic pigments, such as C.I. Pigment White 6, 18, and 21, titanium oxide, zinc oxide, zinc sulfide, antimony oxide, magnesium oxide, and zirconium oxide. In addition to the white inorganic pigments, white organic pigments, such as white hollow resin particles and white polymer particles, may also each be used.

In addition to the above-mentioned pigments, a pearl pigment or a metallic pigment may also be used. Examples of the pearl pigment include pigments each having pearly luster or interference luster, such as titanium dioxide-coated mica, fish scale flake, and bismuth oxychloride. Examples of the metallic pigment include particles each formed of a simple substance or an alloy of aluminum, silver, gold, platinum, nickel, chromium, tin, zinc, indium, titanium, or copper.

The pigments may be used alone or in combination thereof.

Dye

Examples of the dye out of the above-mentioned coloring materials include, but not limited to, an acidic dye, a direct dye, a reactive dye, and a basic dye. Specific examples of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35. The dyes may be used alone or in combination thereof.

The content of the coloring material is preferably from 0.5 mass % to 15 mass %, more preferably from 1 mass % to 10 mass %, particularly preferably from 1 mass % to 5 mass % with respect to the total mass (100 mass %) of the ink composition.

1.2 Resin Particles

The inkjet ink composition according to this embodiment includes the resin particles. The resin particles are composite resin particles each formed of a first resin and a second resin that are acrylic resins. In the resin particles, when a root sum square δph of each of the first resin and the second resin is calculated from $\delta ph=\sqrt{(\delta p^2+\delta h^2)}$ where δp and δh represent a polar component and a hydrogen-bonding component of Hansen solubility parameters thereof, respectively, a δph1 of the first resin is from 4.0 $MPa^{1/2}$ to 4.8 $MPa^{1/2}$, and a δph2 of the second resin is more than 2.6 $MPa^{1/2}$ and less than 3.7 $MPa^{1/2}$.

The content (in terms of solid content) of the resin particles is preferably from 1 mass % to 20 mass %, more preferably from 2 mass % to 15 mass %, still more preferably from 3 mass % to 12 mass %, particularly preferably from 3 mass % to 10 mass % with respect to the total mass of the ink composition. Further, the content is preferably from 4 mass % to 8 mass %. When the content of the resin particles falls within the above-mentioned ranges, there is a tendency that both of the abrasion resistance of an image and the clogging recoverability of an inkjet head nozzle can be improved in a balanced manner.

1.2.1 Form

The composite resin particles each preferably have a phase-separated structure in which a phase (portion) formed of the first resin and a phase (portion) formed of the second resin are separated from each other.

The form of each of the composite resin particles is as follows: the first resin and the second resin form one part of each of the resin particles and the other part thereof, respectively. For example, a form in which the resins form the peripheral portion and central portion of each of the resin particles, and any form other than the foregoing are permitted. For example, the following form is permitted: the positions of the first resin and the second resin in each of the composite resin particles are not simple configurations but complexly intertwined with each other; or the portion formed of the first resin and/or the portion formed of the second resin is not continuous but divided into a plurality of parts to form the composite resin particles. In addition, with regard to a boundary between the first resin and second resin of each of the composite resin particles, not only a case in which the boundary is clearly defined but also a case in which resin composition continuously changes from the first resin to the second resin is permitted.

It is preferred that the composite resin particles each have a phase-separated structure in which a phase formed of the first resin and a phase formed of the second resin are separated from each other, and the phase formed of the first resin be included in the phase formed of the second resin. When the composite resin particles each have such form, the resin particles can be further suppressed from being dissolved in an inkjet head to cause clogging. In addition, there is a tendency that the resin particles are more sufficiently dissolved after their adhesion to a recording medium to smooth an ink film, and hence the abrasion resistance of a recorded product can be further improved.

The term "included" means that one phase is present in the other phase, and part of the one phase may be exposed. At this time, the position at which the one phase is present in the other phase is not particularly limited, and the phase may be present near the center of the other phase or at an arbitrary position deviating from the vicinity of the center as a single body or while being divided into a plurality of parts. Examples of such form include a core-shell structure and a sea-island structure.

As one form of each of the composite resin particles, a form in which one of the first resin or the second resin mainly forms the vicinity (shell portion) of the peripheral portion of the composite resin particle, and the other thereof mainly forms the vicinity (core portion) of the central portion of the resin particle is referred to as "composite resin particle having a core-shell structure" or "core-shell resin particle." Herein, the resin portion for forming the peripheral portion of each of the core-shell resin particles is referred to as "shell resin," and the resin portion for forming the central portion thereof is referred to as "core resin." The core portion may be present in a place other than the central portion of each of the resin particles. In addition, part of the portion formed of the core resin may be exposed to the outermost surface of each of the resin particles. The core portion may be spherical or nonspherical. Of such particles, core-shell resin particles in each of which the first resin is used as the core portion and the second resin is used as the shell portion are preferred because clogging recoverability, abrasion resistance, and the like become more excellent.

In addition, as another form of each of the composite resin particles, a composite resin particle having a sea-island structure in which a portion formed of one of the first resin or the second resin is present in an island shape in the sea of a portion formed of the other thereof is permitted. In the composite resin particle having a sea-island structure, part of a portion formed of one resin may be exposed to the outermost surface of the resin particle, and not only a form in which the islands are uniformly present in the composite resin particle but also a form in which the islands are unevenly present is permitted. In addition, the shape of each of the islands may be spherical or nonspherical, and the islands may come in various sizes. Of such particles, composite resin particles each having a sea-island structure formed of an island formed of the first resin and a sea formed of the second resin are preferred because the clogging recoverability, the abrasion resistance, and the like become more excellent.

The composite resin particles are preferably composite resin particles each having a core-shell structure or a sea-island structure because the clogging recoverability, the abrasion resistance, and the like become more excellent. Such a structure that in an image obtained by observing one composite resin particle with a transmission electron microscope (TEM), its core portion is observed as one continuous portion is defined as the core-shell structure. The following structure is defined as the sea-island structure: the structure is similar to the core-shell structure, but its core portions are observed in two or more portions that are not continuous with each other, or the portions are observed in a larger number of portions. With regard to the terms "core portion" and "island portion," when the number of the core portions is one, the portion is referred to as "core portion," and when the core portion is divided into two or more portions, or into a larger number of portions, the portions are referred to as "island portions."

The composite resin particles are preferred from the viewpoint that the resin characteristics of the first resin and the second resin can be independently controlled, and hence the solubility of each of the resin particles is easily adjusted. An example of the resin characteristics is the δph in at least one embodiment of the present disclosure. In addition, other resin characteristics, such as the glass transition points and crosslinking degrees of the resins, may be controlled. For example, when the shell portion or sea of each of the resin particles is formed from the second resin, and the second resin is a resin that is hardly soluble in the ink, the resin particles become hardly soluble in the ink at the time of recording. In addition, when the core portion or island thereof is formed from the first resin, and the first resin is a resin that is easily soluble on a recording medium, the resin particles are easily soluble on the recording medium. That is, the composite resin particles each preferably have at least one of: a core-shell structure in which the first resin is used as the core portion and the second resin is used as the shell portion; or such a sea-island structure that the first resin is present in an island shape in the second resin. In this case, the clogging recoverability and the abrasion resistance tend to be more excellent.

1.2.2 Resin Component

First Resin

The first resin for forming part of the composite resin particles may be a homopolymer or a copolymer.

In the root sum square $\delta ph=\sqrt{(\delta p^2+\delta h^2)}$ of the polar component δp and hydrogen-bonding component δh of the Hansen solubility parameters, the δph1 of the first resin is from 4.0 $MPa^{1/2}$ to 4.8 $MPa^{1/2}$, preferably from 4.2 $MPa^{1/2}$ to 4.8 $MPa^{1/2}$, more preferably from 4.4 $MPa^{1/2}$ to 4.8 $MPa^{1/2}$, still more preferably from 4.5 $MPa^{1/2}$ to 4.7 $MPa^{1/2}$. When the δph1 of the first resin falls within the above-mentioned ranges, there is a tendency that the composite resin particles become easily soluble, and are hence quickly dissolved on a recording medium to form a coating film, to thereby further improve the abrasion resistance of an image.

The term "Hansen solubility parameters (HSP values)" as used herein refers to values, which are formed of three components, that is, a dispersion component (δd), a polar component (δp), and a hydrogen-bonding component (δh), and represent the solubility behavior of a material contributing to a cohesive energy density. In addition, the term "HSP values" as used herein refers to solubility parameters (unit: $MPa^{1/2}$) calculated from software "Hansen Solubility Parameters in Practice (HSPiP)" version 5.3.06.

A value, which is obtained by multiplying the δph of a homopolymer of each of monomers used in the synthesis of the first resin by the volume ratio of the homopolymer of the monomer to the total number of volumes of all the homopolymers of the respective monomers to calculate the weighted average of the δphs, is used as the δph1 of the first resin. To set the δph1 of the first resin within the above-mentioned ranges, for example, the following only needs to be performed: a monomer component having a δph within the above-mentioned ranges is used as a monomer component for forming the resin; or when a plurality of kinds of monomers are used, the plurality of kinds of monomers are selected and their mass ratios are determined so that the δph of the resin may fall within the above-mentioned ranges.

The lower limit value of the glass transition temperature (hereinafter also referred to as "Tg") of the first resin is preferably 10° C. or more, more preferably 60° C. or more, still more preferably 63° C. or more, still further more preferably 65° C. or more, particularly preferably 67° C. or more. The upper limit value thereof is preferably 95° C. or less, more preferably 80° C. or less, still more preferably 75° C. or less. When the Tg of the first resin is 80° C. or less, the abrasion resistance of an image tends to be further improved because the first resin is easily dissolved on a recording medium by heating treatment or the like to form a coating film. In addition, when the Tg of the first resin is 10° C. or more, clogging recoverability tends to be improved because even in the case where a head scans the top of a heated platen, the first resin can be suppressed from melting in the ink.

When the first resin is a homopolymer, values described in various literatures (e.g., "Polymer Handbook") may each be used as the glass transition temperature (Tg) of the first resin. In at least one embodiment of the present disclosure, the "Tg" is calculated on the basis of D. W. Van Krevelen's estimation method, and the estimation method is based on the contribution of each atomic group to the glass transition temperature and the molecular weight thereof (D. W. Van Krevelen, Klaas te Nijenhuis, "Properties of Polymers, Fourth Edition," Elsevier Science, 2009). In this specification, a value calculated by the Synthia module of known software "BIOVIA Materials Studio 2020" (manufactured by Dassault Systems) is used. Meanwhile, when the first resin is a copolymer, the Tg of the first resin may be calculated from the $Tg_n$s (unit: K) of various homopolymers and the mass fractions ($W_n$s) of monomers by using the following FOX equation:

$$\frac{1}{Tg} = \frac{W_1}{Tg_1} + \frac{W_2}{Tg_2} + \ldots + \frac{W_n}{Tg_n}$$

where $W_n$ represents the mass fraction of each monomer, $Tg_n$ represents the Tg (unit: K) of the homopolymer of each monomer, and Tg represents the Tg (unit: K) of the copolymer.

To set the Tg of the first resin within the above-mentioned ranges, the following only needs to be performed: a monomer having a Tg within the above-mentioned ranges is used as a monomer to be used in the preparation of the resin; or a monomer to be used in the preparation of the resin is selected and its mass fraction is adjusted so that the Tg of the first resin in the equation may fall within the above-mentioned ranges.

An acrylic resin is used as the first resin. The acrylic resin is a resin having at least a (meth)acrylic monomer unit, and is preferred because its various physical property values are easily controlled and the resin is easily available. The content of the (meth)acrylic monomer unit is preferably 30 mass % or more, more preferably 50 mass % or more, still more preferably 70 mass % or more. The content of the (meth)acrylic monomer unit may be 100 mass %, and is preferably 90 mass % or less because various physical properties are easily obtained. The acrylic resin may be a resin having the (meth)acrylic monomer unit and any monomer unit other than the (meth)acrylic monomer unit, and this case is preferred because the various physical property values of the resin are easily adjusted. The other monomer unit is, for example, a vinyl monomer unit. In addition, the acrylic resin preferably has an aromatic monomer unit. Examples of the aromatic monomer unit include an aromatic vinyl monomer unit and an aromatic (meth)acrylic monomer unit. A resin having an aromatic vinyl monomer unit out of those units is preferred. Herein, when the amount of all the constituent units of the first resin is defined as 100 mass %, the lower limit value of the constituent ratio of the aromatic monomer unit is preferably 5 mass % or more, more preferably 10 mass % or more, particularly preferably 15 mass % or more. Meanwhile, the upper limit value of the content of the aromatic monomer unit is preferably 100 mass % or less, more preferably 95 mass % or less, particularly preferably 90 mass % or less. When the content ratio of the aromatic monomer unit in the first resin falls within the ranges, there is a tendency that an adhesive force occurs at the time of the dissolution of the first resin, and hence adhesiveness between a recording medium and a resin coating film is improved, and as a result, the abrasion resistance of an image is also improved.

A (meth)acrylic monomer unit that is bifunctional or more, the unit serving as a crosslinkable component, may be incorporated at least partially as the (meth)acrylic monomer unit for increasing the glass transition point of the first resin or for turning the resin into a crosslinked resin to be described later, though a unit for such purpose is not particularly limited thereto.

Examples of the (meth)acrylic monomer unit that is bifunctional or more include polyethylene glycol di(meth)acrylate, polypropylene glycol di(meth)acrylate, polytetramethylene glycol di(meth)acrylate, 2-hydroxy-3-(meth)acryloyloxypropyl (meth)acrylate, 1,6-hexanediol di(meth)acrylate, 1,9-nonanediol di(meth)acrylate, 1,10-decanediol di(meth)acrylate, dipropylene glycol di(meth)acrylate, tripropylene glycol di(meth)acrylate, tricyclodecane dimethanol di(meth)acrylate, 9,9-bis[4-(2-(meth)acryloyloxyethoxy)phenyl]fluorene, ethoxylated bisphenol A di(meth)acrylate, propoxylated bisphenol A di(meth)acrylate, propoxylated/ethoxylated bisphenol A di(meth)acrylate, pentaerythritol tri(meth)acrylate, trimethylolpropane tri(meth)acrylate, ditrimethylolpropane tetra(meth)acrylate, pentaerythritol (meth)acrylate, dipentaerythritol hexa(meth)acrylate, ethoxylated isocyanurate tri(meth)acrylate, and ethoxylated pentaerythritol tetra(meth)acrylate.

In addition, the first resin may contain a monofunctional (meth)acrylic monomer unit as the (meth)acrylic monomer unit. Examples of the monofunctional (meth)acrylic monomer unit include: a hydrophilic (meth)acrylate monomer unit; a hydrophobic (meth)acrylate monomer unit having an alkyl group having 3 or more carbon atoms; a hydrophobic (meth)acrylate monomer unit having a cyclic structure; and a (meth)acrylamide monomer unit or an N-substituted derivative thereof.

Examples of the hydrophilic (meth)acrylate monomer unit include, but not particularly limited to, methyl (meth)acrylate, ethyl (meth)acrylate, α-hydroxymethyl (meth)acrylate, 2-hydroxyethyl (meth)acrylate, (poly)ethylene glycol (meth)acrylate, methoxy(poly)ethylene glycol (meth)acrylate, ethoxy(poly)ethylene glycol (meth)acrylate, and (poly)propylene glycol (meth)acrylate. Of those, methyl (meth)acrylate or ethyl (meth)acrylate is preferred. The term "hydrophilic" as used herein means that the solubility of the (meth)acrylate monomer unit in 100 mL of water (20° C.) is 0.3 g or more.

Examples of the hydrophobic (meth)acrylate monomer unit having an alkyl group having 3 or more carbon atoms include, but not particularly limited to, (meth)acrylates each having an alkyl group having 3 or more carbon atoms, such as n-propyl (meth)acrylate, isopropyl (meth)acrylate, n-butyl (meth)acrylate, isobutyl (meth)acrylate, n-amyl (meth)acrylate, isoamyl (meth)acrylate, hexyl (meth)acrylate, 2-ethylhexyl (meth)acrylate, n-octyl (meth)acrylate, nonyl (meth)acrylate, decyl (meth)acrylate, lauryl (meth)acrylate, stearyl (meth)acrylate, cetyl (meth)acrylate, neopentyl (meth)acrylate, and behenyl (meth)acrylate. Of those, lauryl (meth)acrylate is preferred. The term "hydrophobic" as used herein means that the solubility of the (meth)acrylate monomer unit in 100 mL of water (20° C.) is less than 0.3 g.

Examples of the hydrophobic (meth)acrylate monomer unit having a cyclic structure include, but not particularly limited to, cyclohexyl (meth)acrylate, dicyclopentanyl (meth)acrylate, dicyclopentenyl (meth)acrylate, dicyclopentenyloxyethyl (meth)acrylate, isobornyl (meth)acrylate, norbornyl (meth)acrylate, adamantyl (meth)acrylate, and tetrahydrofurfuryl (meth)acrylate.

Examples of the (meth)acrylamide monomer unit or the N-substituted derivative thereof include, but not particularly limited to, (meth)acrylamide or N-substituted derivatives thereof, such as (meth)acrylamide, N-hydroxymethyl (meth) acrylamide, diacetone acrylamide, and N,N-dimethyl (meth) acrylamide.

Examples of the aromatic monomer unit include styrene, α-methylstyrene, p-methylstyrene, vinyltoluene, chlorostyrene, and divinylbenzene.

In addition, the first resin may have a monomer unit other than the above-mentioned monomer units such as a carboxylic acid monomer unit. When the first resin has the carboxylic acid monomer unit, the relative acid value of each of the composite resin particles can be controlled.

Examples of the carboxylic acid monomer unit include, but not particularly limited to, (meth)acrylic acid, crotonic acid, maleic acid, fumaric acid, and itaconic acid. Of those, (meth)acrylic acid is preferred. The term "carboxylic acid monomer unit" as used herein refers to a polymerizable monomer unit having a carboxyl group and a polymerizable unsaturated group.

The above-mentioned monomers may be used alone or in combination thereof.

The first resin may be crosslinked. When the resin is crosslinked, for example, the resin only needs to contain the above-mentioned (meth)acrylic monomer unit that is bifunctional or more, the unit serving as a crosslinkable component, to contain a monomer unit that is bifunctional or more, the unit having a polymerizable functional group other than a (meth)acrylic group, or to be crosslinked by using, for example, a crosslinking agent that imparts a crosslinked structure to the resin.

The first resin is preferably a resin in which the content of the crosslinkable component is small, more preferably a resin other than a crosslinked resin containing the crosslinkable component, still more preferably a resin having a monofunctional (meth)acrylic monomer unit, though a preferred resin is not limited thereto. When the first resin is a resin other than a crosslinked resin, the resin is quickly dissolved on a recording medium to form a coating film, and hence the adhesiveness of the coating film with the recording medium and the abrasion resistance of an image are further improved in some cases.

Examples of the monofunctional (meth)acrylic monomer unit include, but not particularly limited to: a hydrophilic (meth)acrylate monomer unit; a hydrophobic (meth)acrylate monomer unit having an alkyl group having 3 or more carbon atoms; a hydrophobic (meth)acrylate monomer unit having a cyclic structure; and a (meth)acrylamide monomer unit or an N-substituted derivative thereof. Specific examples of those monofunctional (meth)acrylic monomers include the same examples as those listed above.

Second Resin

The second resin for forming part of the composite resin particles may be formed as a resin independent of the above-mentioned first resin in the same manner as in the first resin except that the following δph2 falls within the following ranges. An acrylic resin is used as the second resin.

In the root sum square $\delta ph=\sqrt{(\delta p^2+\delta h^2)}$ of the polar component δp and hydrogen-bonding component δh of the Hansen solubility parameters, the δph2 of the second resin is more than 2.6 $MPa^{1/2}$ and less than 3.7 $MPa^{1/2}$, preferably from 2.7 $MPa^{1/2}$ to 3.5 $MPa^{1/2}$, more preferably from 2.7 $MPa^{1/2}$ to 3.3 $MPa^{1/2}$, still more preferably from 2.7 $MPa^{1/2}$ to 3.2 $MPa^{1/2}$, still further more preferably from 2.8 $MPa^{1/2}$ to 3.1 $MPa^{1/2}$. When the δph2 of the second resin falls within the above-mentioned ranges, there is a tendency that the composite resin particles become hardly soluble in the ink, and hence clogging recoverability is improved. In addition, it becomes easier to suppress foreign matter and to make the abrasion resistance and OD value of an image excellent. The simple description "from ○ to Δ (where ○ and Δ each represent a numerical value)" has a meaning including the numerical values on the ends of the range.

The second resin may be a homopolymer or a copolymer. In addition, it is preferred that the content of the crosslinkable component of the second resin be made higher than that of the first resin because there is a tendency that the composite resin particles become hardly soluble in the ink, and hence the clogging recoverability is improved.

The lower limit value of the Tg of the second resin is preferably 60° C. or more, more preferably 65° C. or more, still more preferably 70° C. or more, still further more preferably 75° C. or more, particularly preferably 80° C. or more. The upper limit value thereof is preferably 110° C. or less, more preferably 100° C. or less, still more preferably 95° C. or less, particularly preferably 90° C. or less. When the Tg of the second resin is 110° C. or less, the abrasion resistance of an image tends to be improved because the second resin is dissolved on a recording medium by heating treatment or the like to form a coating film. In addition, when the Tg of the second resin is 60° C. or more, clogging recoverability tends to be improved because even in the case where a head scans the top of a heated platen, the second resin can be suppressed from melting in the ink.

A difference (Tg of second resin-Tg of first resin) between the Tg of the first resin and the Tg of the second resin is preferably from 3° C. to 25° C., more preferably from κ° C. to 20° C., still more preferably from 10° C. to 19° C., particularly preferably from 15° C. to 18° C.

The Tg of the second resin may be determined in the same manner as in the case of the Tg of the first resin.

As in the first resin, an acrylic resin having a (meth) acrylic monomer unit is used as the second resin. In addition, as in the first resin, the second resin may have a monomer unit other than the above-mentioned monomer units, such as a carboxylic acid monomer unit. When the second resin has the carboxylic acid monomer unit, the relative acid value of each of the composite resin particles can be controlled. Specific examples of the carboxylic acid monomer unit include the same examples as those listed above.

1.2.3 Physical Properties

In each of the composite resin particles, a weighted average $\delta ph=(v1\delta ph1+v2\delta ph2)/(v1+v2)$ based on the volume ratio (v1/v2) of the first resin to the second resin is preferably from 3.4 $MPa^{1/2}$ to 4.1 $MPa^{1/2}$, more preferably from 3.5 $MPa^{1/2}$ to 4.0 $MPa^{1/2}$ still more preferably from 3.6 $MPa^{1/2}$ to 3.9 $MPa^{1/2}$, particularly preferably from 3.6 $MPa^{1/2}$ to 3.8 $MPa^{1/2}$. When the weighted average δph in each of the composite resin particles falls within the above-mentioned ranges, there is a tendency that the abrasion resistance of the image is further improved, and the clogging recoverability is further improved.

The δph1 of the first resin is higher than the δph2 of the second resin, and is preferably higher by 1.0 $MPa^{1/2}$ or more, more preferably higher by 1.0 $MPa^{1/2}$ or more and 2.0 $MPa^{1/2}$ or less, still more preferably higher by 1.2 $MPa^{1/2}$ or more and 2.0 $MPa^{1/2}$ or less, particularly preferably higher by 1.4 $MPa^{1/2}$ or more and 2.0 $MPa^{1/2}$ or less, more particularly preferably higher by 1.5 $MPa^{1/2}$ or more and 1.8 $MPa^{1/2}$ or less. When a difference between the δph1 of the first resin and the δph2 of the second resin falls within the above-mentioned ranges, there is a tendency that the abrasion resistance of the image is further improved, and the clogging recoverability is further improved.

The volume-average particle diameter of the composite resin particles is preferably from 90 nm to 250 nm, more preferably from 90 nm to 220 nm, still more preferably from 90 nm to 190 nm, particularly preferably from 100 nm to 160 nm, more particularly preferably from 120 nm to 160 nm. When the volume-average particle diameter of the composite resin particles falls within the ranges, a balance between resin solubilities tends to be excellent. That is, the composite resin particles are hardly soluble in the ink, and hence the clogging recoverability is further improved. In addition, after the ejection of the ink onto a recording medium, the composite resin particles are easily dissolved to quickly form a coating film, and hence the abrasion resistance of an image is improved. When the volume-average particle diameter of the composite resin particles does not deviate from the ranges, light scattering caused by the composite resin particles enlarges to reduce the OD value of the image, and hence the glossiness thereof hardly becomes unsatisfactory. The term "volume-average particle diameter" means an average particle diameter on a volume basis measured with a particle size distribution-measuring apparatus using a dynamic light scattering method as a measurement principle. In Examples to be described later, the average particle diameter (nm) of the composite resin particles measured with Nanotrac WAVE II (manufactured by MicrotracBEL Corp.) is used.

In each of the composite resin particles, the mass ratio (first resin/second resin) of the first resin to the second resin is preferably from 0.3 to 3.5, more preferably from 0.4 to 3.0, still more preferably from 0.5 to 2.0. Further, the lower limit of the mass ratio (first resin/second resin) is more preferably 1/1.8 or more, still more preferably 1/1.5 or more, particularly preferably 1/1.3 or more. The lower limit is more preferably 0.8 or more, still more preferably 1.0 or more.

The upper limit of the mass ratio (first resin/second resin) is preferably 1/0.6 or less, more preferably 1/0.7 or less, particularly preferably 1/0.8 or less. When the lower limit of the mass ratio (first resin/second resin) is equal to or more than the above-mentioned ranges, there is a tendency that the resin particles are easily soluble in a post-heating step, and hence the abrasion resistance becomes more excellent. In addition, when the upper limit of the mass ratio (first resin/second resin) is equal to or less than the above-mentioned ranges, there is a tendency that the resin particles become hardly soluble in the ink, and hence the clogging recoverability is improved.

The acid value of the second resin is preferably from 5 mgKOH/g to 35 mgKOH/g, more preferably from 7 mgKOH/g to 20 mgKOH/g, still more preferably from 10 mgKOH/g to 15 mgKOH/g. When the acid value of each of the composite resin particles falls within the ranges, both of the clogging recoverability and the abrasion resistance of an image tend to be improved.

The acid value is a parameter serving as an index of whether the composite resin particles are hydrophilic or hydrophobic. As the value becomes larger, the particles become more hydrophilic, and as the value becomes smaller, the particles become more hydrophobic. Accordingly, when the acid value of the second resin for forming mainly the outermost surface layers of the composite resin particles is less than the ranges, the composite resin particles and an organic solvent easily conform to each other, and hence the composite resin particles become easily soluble in the ink. Accordingly, clogging may occur owing to resin welding in an inkjet head to result in poor clogging recoverability. Meanwhile, when the acid value of the second resin is more than the ranges, the composite resin particles and water easily conform to each other, and hence the water is liable to remain on a recording medium without being volatilized. Accordingly, a uniform coating film is not formed, and hence the abrasion resistance of an image becomes unsatisfactory in some cases.

The acid value of the second resin may be determined from the molecular weight and content of a monomer unit for the second resin for forming the composite resin particles, and the number of anionic groups in the monomer unit through calculation. Specifically, the acid value is determined from the configuration of the second resin for forming the composite resin particles through calculation by using the following equations.

$$((\text{Number of parts by mass of monomer 2 having anionic group out of monomers for forming second resin/total number of parts by mass of all monomers for forming second resin})/\text{molecular weight of monomer 2})\times\text{number of anionic groups in molecule of monomer } 2=A1 \quad \text{(Equation 1)}$$

$$A1\times 56.11\times 1{,}000=\text{acid value of second resin (mgKOH/g)} \quad \text{(Equation 2)}$$

The term "anionic group" refers to a carboxyl group. When the monomers for forming the second resin include a plurality of kinds of monomers each having an anionic group, the number A2, A3, . . . of anionic groups is calculated for each monomer by using the same equation as the equation 1, and the total value of A1+A2+A3+ . . . is similarly calculated as the A1 of the equation 2.

The acid value of the second resin is determined from the second resin on the assumption that in the case where the phase formed of the first resin is included in the phase formed of the second resin, characteristics resulting from the outermost surfaces of the composite resin particles result from the resin for forming the outermost surfaces of the composite resin particles.

The glass transition temperature of each of the first resin and the second resin is preferably from 60° C. to 95° C., more preferably from 62° C. to 88° C., still more preferably from 64° C. to 86° C. When the glass transition temperature of each of the first resin and the second resin falls within the above-mentioned ranges, there is a tendency that a balance between the suppression of the melting of the resins and the dissolution thereof is excellent, and hence the abrasion resistance of an image is further improved, and the clogging recoverability is further improved.

1.2.4 Synthesis Method

Although a method of synthesizing the composite resin particles is not particularly limited, the particles may be synthesized by, for example, any one of known emulsion polymerization methods or an appropriate combination thereof. Specific examples of such methods include a batch mixing polymerization method, a monomer dropping method, a pre-emulsion method, a seed emulsion polymerization method, a multi-stage emulsion polymerization method (e.g., a two-stage emulsion polymerization method), and a phase-inversion emulsion polymerization method.

Herein, the composite resin particles are preferably resin particles dispersed with a reactive surfactant. When a surfactant adsorbing to the resin particles desorbs, the surfactant moves to an interface between the ink and a recording medium to inhibit the adhesiveness of an ink film with the recording medium, and hence the abrasion resistance of an image deteriorates in some cases. In contrast, the reactive surfactant is a compound containing a carbon-carbon double bond, and hence can be bonded to the composite resin particles through utilization of such double bond. Accordingly, in the resin particles dispersed with the reactive surfactant, the surfactant hardly desorbs from the resin particles, and hence hardly inhibits the adhesiveness of the ink film. Accordingly, the abrasion resistance tends to be further improved.

Although the reactive surfactant may be any one of anionic, cationic, nonionic, and amphoteric surfactants, the surfactant is preferably anionic. When the reactive surfactant is anionic, there is a tendency that the dispersion stability of the resin particles is further improved, and hence the abrasion resistance and the clogging recoverability become more excellent.

The reactive surfactant preferably has an oxyalkylene group. Thus, there is a tendency that the dispersion stability of the resin particles is further improved, and hence the abrasion resistance and the clogging recoverability become more excellent. Examples of the oxyalkylene group include an oxyethylene group ($—OCH_2CH_2—$) and an oxypropylene group ($—OCH_2CH_2CH_2—$ or $—OCH_2CH(CH_3)—$). The number of the carbon atoms of the oxyalkylene group is preferably from 2 to 5, more preferably 2 or 3. In addition, the oxyalkylene group may be a polyoxyalkylene group in which a plurality of oxyalkylene groups are bonded to each other. The number "n" of repetitions of the oxyalkylene group in the polyoxyalkylene group may be from 2 to 100, may be from 2 to 50, or may be from 2 to 30.

Examples of the reactive surfactant include a polyoxyalkylene alkenyl ether sulfuric acid ester, a polyoxyalkylene alkenyl ether, a polyoxyethylene styrenated propenyl phenyl ether sulfuric acid ester, a polyoxyethylene-1-(allyloxymethyl) alkyl ether sulfuric acid ester, a polyoxyethylene styrenated propenyl phenyl ether, a polyoxyethylene-1-(allyloxymethyl) alkyl ether, an α-[2-[(allyloxy)-1-(alkyloxymethyl)]ethyl]-ω-polyoxyethylene sulfuric acid ester, an α-[2-[(allyloxy)-1-(alkyloxymethyl)]ethyl]-ω-polyoxyethylene, an alkyl allyl sulfosuccinic acid, a methacryloyloxypolyoxypropylene sulfuric acid ester, styrenesulfonic acid, a bis(polyoxyethylene polycyclic phenyl ether) methacrylate sulfuric acid ester, sulfoethyl methacrylate, and salts thereof. Of those, an α-[2-[(allyloxy)-1-(alkyloxymethyl)]ethyl]-ω-polyoxyethylene sulfuric acid ester salt or a polyoxyethylene-1-(allyloxymethyl) alkyl ether sulfuric acid ester salt is preferred as the reactive surfactant.

A commercial product may be used as the reactive surfactant, and examples thereof include ADEKA REASOAP SR-10, SR-1025, SR-20, and SR-3025 (which are product names, manufactured by ADEKA Corporation, α-[2-[(allyloxy)-1-(alkyloxymethyl)]ethyl]-ω-polyoxyethylene sulfuric acid ester ammonium salt), ADEKA REASOAP ER-10, ER-20, ER-30, and ER-40 (which are product names, manufactured by ADEKA Corporation, α-[2-[(allyloxy)-1-(alkyloxymethyl)]ethyl]-ω-polyoxyethylene), AQUALON AR-10, AR-1025, AR-20, and AR-2020 (which are product names, manufactured by DKS Co. Ltd., polyoxyethylene styrenated propenyl phenyl ether sulfuric acid ester ammonium salt), AQUALON KH-05, KH-10, and KH-1025 (which are product names, manufactured by DKS Co. Ltd., polyoxyethylene-1-(allyloxymethyl) alkyl ether sulfuric acid ester ammonium salt), AQUALON AN-10, AN-30, and AN-5065 (which are product names, manufactured by DKS Co. Ltd., polyoxyethylene styrenated propenyl phenyl ether), LATEMUL PD-104 and PD-105 (which are product names, manufactured by Kao Corporation, polyoxyalkylene alkenyl ether sulfuric acid ammonium salt), LATEMUL PD-420, PD-430, and PD-450 (which are product names, manufactured by Kao Corporation, polyoxyalkylene alkenyl ether), ELEMINOL JS-20 (product name, manufactured by Sanyo Chemical Industries, Ltd., alkyl allyl sulfosuccinic acid sodium salt), ELEMINOL RS-3000 (product name, manufactured by Sanyo Chemical Industries, Ltd., methacryloyloxypolyoxypropylene sulfuric acid ester sodium salt), SPINOMAR NaSS (product name, manufactured by Tosoh Finechem Corporation, styrenesulfonic acid sodium salt), Antox MS60 (product name, manufactured by Nippon Nyukazai Co., Ltd., bis(polyoxyethylene polycyclic phenyl ether) methacrylate sulfuric acid ester amine salt), and Antox MS-2N-D (product name, manufactured by Nippon Nyukazai Co., Ltd., sulfoethyl methacrylate sodium salt).

The composite resin particles may be resin particles dispersed with a nonreactive surfactant. The term "nonreactive surfactant" as used herein refers to a compound that is free of any carbon-carbon double bond. Examples of the nonreactive surfactant include, but not particularly limited to: anionic surfactants, such as an alkyl sulfuric acid ester salt, an alkylbenzene sulfonic acid salt, and an alkyl carboxylic acid salt; and nonionic surfactants, such as an alkyl ester of polyethylene glycol, an alkyl ether of polyethylene glycol, and an alkyl phenyl ether of polyethylene glycol.

A commercial product may be used as the nonreactive surfactant, and examples thereof include HITENOL LA-16, HITENOL NF-13, HITENOL NF-08, HITENOL NF-17, HITENOL 330T, HITENOL LA-10, DKS NL-600, NOIGEN EA-137, NOIGEN EA-207D, PLYSURF A212C, and PLYSURF A208B (which are manufactured by DKS Co. Ltd.), Newcol 271A (manufactured by Nippon Nyukazai Co., Ltd.), LATEMUL WX, LATEMUL E-150, EMULGEN 1108, and EMULGEN 1150S-60 (which are manufactured by Kao Corporation), DOWFAX 2A1 (manufactured by The Dow Chemical Company), and ELEMINOL CLS-20, ELEMINOL HB-29, and SANMORIN OT-70 (which are manufactured by Sanyo Chemical Industries, Ltd.).

Meanwhile, the composite resin particles may be soap-free type resin particles. The term "soap-free type resin particles" as used herein refers to resin particles that can maintain a stable dispersed state without use of a dispersant such as a surfactant and without aggregating. In such soap-free type resin particles, a surfactant never desorbs from the resin particles, and hence the adhesiveness of an ink film with a recording medium is not inhibited. Accordingly, the abrasion resistance of an image tends to be further improved.

The composite resin particles are preferably resin particles neutralized with at least an organic amine or ammonia. Such resin particles tend to provide more excellent abrasion resistance. Examples of the organic amine include (tri)methylamine, (tri)ethanolamine, (tri)ethylamine, dimethylethanolamine, and morpholine. The composite resin particles may be neutralized by further using an inorganic alkali, such as sodium hydroxide or potassium hydroxide, as required.

A method of synthesizing core-shell resin particles or sea-island structure resin particles in each of which a core portion or an island portion is formed from the first resin, and a shell portion or a sea portion is formed from the second resin, the resin particles serving as an example of the composite resin particles, is described in detail below.

Synthesis Method 1

First, the particles of the first resin are synthesized by a typical emulsion polymerization method including using an aqueous medium. Although conditions for the emulsion polymerization only need to follow a known method, in, for example, the case where the total amount of a monomer to be used is set to 100 parts, the polymerization may be typically performed by using 100 parts to 500 parts of water (aqueous medium). A polymerization temperature is preferably from −10° C. to 100° C., more preferably from −5° C. to 100° C., still more preferably from 0° C. to 90° C. In addition, a polymerization time is preferably from 0.1 hour to 30 hours, more preferably from 2 hours to 25 hours. For example, a batch system including collectively loading the monomer, a system including supplying the monomer in a divided or continuous manner, a system including adding a pre-emulsion of the monomer in a divided or continuous manner, or a system in which these systems are combined in a stepwise manner may be adopted as the system of the emulsion polymerization. In addition, a polymerization initiator, a molecular weight modifier, an emulsifying agent, and the like to be used in the typical emulsion polymerization may be used alone or in combination thereof as required.

The polymerization initiator is not particularly limited, but for example, persulfate salts, such as potassium persulfate and ammonium persulfate; organic peroxides, such as diisopropyl peroxydicarbonate, benzoyl peroxide, lauroyl peroxide, and tert-butyl peroxy-2-ethylhexanoate; azo compounds, such as azobisisobutyronitrile, dimethyl-2,2'-azobisisobutyrate, and 2-carbamoylazaisobutyronitrile; and redox systems each using a combination of a radical emulsifier containing a radical emulsifying compound having a peroxide group, sodium hydrogen sulfite, and a reducing agent such as ferrous sulfate may each be used. The polymerization initiators may be used alone or in combination thereof.

Examples of the molecular weight modifier include, but not particularly limited to: mercaptans, such as n-hexyl mercaptan, n-octyl mercaptan, n-dodecyl mercaptan, t-dodecyl mercaptan, n-hexadecyl mercaptan, n-tetradecyl mercaptan, t-tetradecyl mercaptan, and thioglycolic acid; xanthogen disulfides, such as dimethyl xanthogen disulfide, diethyl xanthogen disulfide, and diisopropyl xanthogen disulfide; thiuram disulfides, such as tetramethylthiuram disulfide, tetraethylthiuram disulfide, and tetrabutylthiuram disulfide; halogenated hydrocarbons, such as chloroform, carbon tetrachloride, carbon tetrabromide, and ethylene bromide; hydrocarbons, such as pentaphenylethane and an α-methylstyrene dimer; and acrolein, methacrolein, allyl alcohol, 2-ethylhexyl thioglycolate, terpinolene, α-terpinene, γ-terpinene, dipentene, and 1,1-diphenylethylene. The molecular weight modifiers may be used alone or in combination thereof.

The emulsifying agent is a surfactant, such as the reactive surfactant (reactive emulsifying agent) or the nonreactive surfactant (nonreactive emulsifying agent) described above.

Examples of the emulsifying agent may include, but not particularly limited to: an anionic surfactant, such as an alkyl sulfuric acid ester salt or an alkylbenzene sulfonate; a nonionic surfactant, such as an alkyl ester of polyethylene glycol, an alkyl ether of polyethylene glycol, or an alkyl phenyl ether of polyethylene glycol; a reactive emulsifying agent containing a hydrophilic group, a hydrophobic group, and a radical reactive group; and a polymer emulsifying agent obtained by introducing a hydrophilic group into a polymer, such as a vinyl-based polymer or a polyester-based polymer. The emulsifying agents may be used alone or in combination thereof. The term "hydrophilic group" refers to an atomic group having a high affinity for water, and examples thereof include a nitro group, a hydroxy group, an amino group, a carboxyl group, and a sulfonic acid group. In addition, the term "hydrophobic group" refers to an atomic group having an affinity for water lower than that of the hydrophilic group, and examples thereof include a linear or branched alkyl group, an alicyclic group, an aromatic ring group, an alkylsilyl group, and a perfluoroalkyl group.

When a resin emulsion can maintain a stable dispersed state without aggregating, the particles of the first resin may be produced in a soap-free manner in which no emulsifying agent is used.

Next, a monomer for the second resin is polymerized in the presence of the resultant particles of the first resin. Specifically, when the monomer for the second resin is subjected to seed polymerization under a state in which the resultant particles of the first resin are used as seed particles, the core-shell resin particles or the sea-island structure resin particles can be formed. For example, the monomer for the second resin or a pre-emulsion thereof and a crosslinking agent to be used as required only need to be dropped into the aqueous medium having dispersed therein the particles of the first resin in a collective, divided, or continuous manner. The amount of the particles of the first resin to be used at this time is preferably set to from 50 parts by mass to 200 parts by mass with respect to 100 parts by mass of the monomer for the second resin. When the crosslinking agent is used at the time of the polymerization, the second resin can be crosslinked.

When the crosslinking agent is used, examples of the crosslinking agent include, but not particularly limited to, a phenol resin and an amino resin. The phenol resin may be, for example, a resole-type phenol resin obtained by subjecting a phenol, such as phenol or bisphenol A, and an aldehyde such as formaldehyde to a condensation reaction in the presence of a reaction catalyst to introduce a methylol group. Examples of the aldehyde include formaldehyde, paraformaldehyde, acetaldehyde, and benzaldehyde. In addition, a product obtained by etherifying at least part of the methylol groups of the above-mentioned resin with an alcohol having 1 to 8 carbon atoms, such as methyl alcohol, ethyl alcohol, n-butyl alcohol, or isobutyl alcohol, may be used. The amino resin is, for example, a methylolated amino resin obtained by a reaction between an amino component, such as melamine, urea, benzoguanamine, spiroguanamine, or dicyandiamide, and an aldehyde.

When a polymerization initiator, a molecular weight modifier, an emulsifying agent, or the like is used at the time of the polymerization, the same material as that at the time of the production of the particles of the first resin may be used. In addition, conditions such as a polymerization time only need to be set to be identical to those at the time of the production of the particles of the first resin.

Synthesis Method 2

Next, a polymerization method including synthesizing the portion of the second resin in advance is described. First, the portion of the second resin is synthesized. Specifically, a pre-emulsion solution containing the above-mentioned hydrophilic monomer is prepared with a reactive emulsifying agent or in a soap-free manner, and the pre-emulsion solution is dropped into an aqueous medium together with a polymerization initiator and a crosslinking agent, followed by a polymerization reaction. Thus, the portion of the second resin is synthesized.

Next, the portion of the first resin is polymerized by using the resultant portion of the second resin as a polymerization site to synthesize the core-shell resin particles or the sea-island structure resin particles according to this embodiment. Specifically, a monomer mixture containing the above-mentioned hydrophobic monomer is dropped into the aqueous dispersion medium containing the portion of the second resin, and the portion of the first resin is polymerized to provide the core-shell resin particles or the sea-island structure resin particles. When the portion of the second resin is used as the polymerization site, the monomer mixture can be dropped as a monomer oil droplet because there is no need to incorporate an emulsifying agent into the mixture.

According to such multi-stage emulsion polymerization method, the portion of the second resin can be synthesized with the reactive emulsifying agent or in a soap-free manner, and the portion of the first resin can be synthesized in an emulsifying agent-free manner. Accordingly, the content of the emulsifying agent in the ink composition can be easily set to 0.01 mass % or less. The content of the emulsifying agent to be incorporated into the ink composition is preferably 0.01 mass % or less because the aggregation of ink components at an ink interface (a gas-liquid interface between the air and the ink, or a solid-liquid interface between a member brought into contact with the ink, such as an ink-storing container, and the ink) is suppressed, and hence the storage stability of the composition becomes excellent. In addition, when the content of the emulsifying agent to be incorporated into the ink composition is 0.01 mass % or less, an ink-storing container having an injection port into which an ink can be loaded can be preferably used because the composition is excellent in foaming property and defoaming property. The term "ink-storing container having an injection port into which an ink can be loaded" as used herein refers to an ink-storing container having a removable or openable and closable injection port. While the container enables a user to easily inject the ink composition, the composition easily foams at the time of the injection. The opening area of the injection port is preferably 20 $mm^2$ or more because such area facilitates the loading of the ink composition. Such ink-storing container is disclosed in, for example, JP-A-2005-219483 or JP-A-2012-51309.

In addition, even when the core-shell resin particles or the sea-island structure resin particles are synthesized by using a large amount of an emulsifying agent, the content of the emulsifying agent in the ink composition may be set to 0.01 mass % or less by removing an excess emulsifying agent after the synthesis of the core-shell resin particles or the sea-island structure resin particles.

Finally, the resultant particles are neutralized with an alkali, such as sodium hydroxide, potassium hydroxide, an organic amine, or ammonia, preferably with at least an organic amine or ammonia so that their pH may be adjusted, followed by filtration as required. Thus, a core-shell resin particle-dispersed liquid is obtained. The particles to be obtained may be changed to the core-shell resin particles or to the sea-island structure resin particles by adjusting, for example, a monomer concentration, a polymerization temperature, a stirring speed, or a polymerization time in the synthesis method. In particular, those polymerization conditions at the time of the synthesis of the first resin are preferably adjusted.

With regard to a method of producing such sea-island structure resin particles or core-shell resin particles, reference only needs to be made to, for example, "Colloids and Surfaces A: Physiochemical and Engineering Aspects 153 (1999) 255-270."

1.3 Water-Soluble Low-Molecular Weight Organic Compound

The inkjet ink composition according to this embodiment includes the water-soluble low-molecular weight organic compound. The water-soluble low-molecular weight organic compound contains 0.5 mass % to 9.0 mass % of the amide having a normal boiling point of from 215° C. to 290° C. with respect to the total mass of the ink composition.

The term "water-soluble" in the water-soluble low-molecular weight organic compound means that the compound has a solubility of more than 10 mass % in water at 20° C. The compound is regarded as being dissolved in water in, for example, the following case: after the compound has been mixed at a predetermined concentration into water at 20° C., and the mixed liquid has been stirred, an undissolved residue is not visually observed or the entirety of the mixed liquid does not visually appear to be opaque. When the compound is dissolved in water, in the case where the minimum concentration of the compound mixed into the water is more than 10 mass %, the compound is regarded as being water-soluble. The unit "mass %" at the time of the representation of a solubility is the mass percent of a low-molecular weight organic compound with respect to the total mass of a mixed liquid obtained by mixing water and the low-molecular weight organic compound.

The term "low-molecular weight" in the water-soluble low-molecular weight organic compound means that the molecular weight of the compound is 300 or less. The molecular weight is preferably 250 or less, more preferably 200 or less, still more preferably from 50 to 200.

The water-soluble low-molecular weight organic compound may be an organic solvent that is a liquid when obtained as a simple substance at normal temperature, or the compound may be a solid when obtained as a simple substance at normal temperature. The compound that is a solid when obtained as a simple substance at normal temperature is, for example, a compound having a melting point higher than normal temperature (25° C.). The melting point may be measured by using differential scanning calorimetry (DSC).

Examples of the water-soluble low-molecular weight organic compound include, but not particularly limited to, a resin-dissolving compound, a permeable compound, and a moisture-retaining compound. The water-soluble low-molecular weight organic compounds may be used alone or in combination thereof.

1.3.1 Amide Having Normal Boiling Point of from 215° C. to 290° C.

The water-soluble low-molecular weight organic compound contains 0.5 mass % to 9.0 mass % of the amide having a normal boiling point of from 215° C. to 290° C. with respect to the total mass of the ink composition. The amide is one kind of resin-dissolving compound. The resin-dissolving compound is an organic compound having a function of dissolving a resin to improve abrasion resistance, but its function is not limited thereto.

Examples of the amide include a cyclic amide and an acyclic amide. Examples of the amide include: cyclic amides (lactams), such as 2-pyrrolidone (2P), 2-piperidone, ε-caprolactam (CPL), N-methyl-ε-caprolactam, N-cyclohexyl-2-pyrrolidone, N-methylpyrrolidone, N-ethylpyrrolidone, N-butylpyrrolidone, 5-methyl-2-pyrrolidone, β-propiolactam, and ω-heptalactam; and linear amides, such as N,N-dimethylacetoacetamide, N,N-diethylacetoacetamide, N-methylacetoacetamide, N,N-dimethylisobutyramide, N,N-dimethylformamide, N,N-diethylformamide, N,N-dimethylacetamide, N,N-diethylacetamide, N,N-dimethylpropionamide, 3-methoxy-N,N-dimethylpropanamide (DMPA), 3-n-butoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of the amide having a normal boiling point of from 215° C. to 290° C. include 2-pyrrolidine (normal boiling point: 245° C.), ε-caprolactam (normal boiling point: 267° C.), and 3-methoxy-N,N-dimethylpropanamide (normal boiling point: 215° C.). One or more kinds selected from those amides are preferred, and ε-caprolactam is more preferred. Such compound tends to provide a more excellent resin-dissolving property.

The amide having a normal boiling point of from 215° C. to 290° C. is preferably a compound that is a solid or a liquid when obtained as a simple substance at normal temperature. Examples of such compound include 2-pyrrolidine, ε-caprolactam, and 3-methoxy-N,N-dimethylpropanamide. One or more kinds selected from those compounds are preferred, and F-caprolactam is more preferred. Such compound tends to provide a more excellent resin-dissolving property.

The molecular weight of the amide having a normal boiling point of from 215° C. to 290° C. is preferably from 50 to 200, more preferably from 80 to 150. In addition, the lower limit of the molecular weight is more preferably 90 or more, and the upper limit thereof is more preferably 130 or less. The molecular weight is still more preferably from 100 to 120.

When the molecular weight falls within the above-mentioned ranges, the abrasion resistance of an image tends to be more excellent.

The normal boiling point of the amide having a normal boiling point of from 215° C. to 290° C. is more preferably from 230° C. to 290° C., still more preferably from 250° C. to 290° C., particularly preferably from 250° C. to 280° C. When the normal boiling point of the amide falls within the above-mentioned ranges, the amide is suppressed from evaporating before sufficient dissolution of the resin particles in a post-heating step, and hence the resin particles can be sufficiently dissolved. In addition, the amide quickly evaporates after the dissolution of the resin particles. Accordingly, the abrasion resistance tends to be more excellent.

The water-soluble low-molecular weight organic compound contains 0.5 mass % to 9.0 mass % of the amide having a normal boiling point of from 215° C. to 290° C. with respect to the total mass of the ink composition. The lower limit of the content is preferably 1.0 mass % or more, more preferably 1.5 mass % or more, still more preferably 2.0 mass % or more, particularly preferably 2.5 mass % or more. The upper limit thereof is preferably 8.0 mass % or less, more preferably 7.0 mass % or less, still more preferably 6.0 mass % or less, particularly preferably 5.0 mass % or less, more particularly preferably 4.0 mass % or less. When the content of the specific amide is set within the above-mentioned ranges, the abrasion resistance and clogging recoverability tend to be more excellent.

1.3.2 Other Water-Soluble Low-Molecular Weight Organic Compound

Examples of the resin-dissolving compound include aprotic polar solvents, such as dimethyl sulfoxide (DMSO) and dioxane, in addition to the above-mentioned amide having a normal boiling point of from 215° C. to 290° C. The resin-dissolving compounds may be used alone or in combination thereof. The use of the resin-dissolving compound tends to suppress the sticking of the composite resin particles in a head or a cavity, and to further improve the adhesiveness thereof with a low-absorbing or non-absorbing recording medium and the abrasion resistance.

Examples of the permeable compound include, but not particularly limited to: alkanediols each preferably having 4 or more carbon atoms, such as butanediol, pentanediol, hexanediol, and octanediol; and glycol ethers, such as an alkylene glycol monoether and an alkylene glycol diether. The permeable compounds may be used alone or in combination thereof. The use of such permeable compound tends to further improve the embeddability (wet spreadability) and permeability of the ink into a recording medium.

The content of the permeable compound is preferably from 0.1 mass % to 10 mass %, more preferably from 0.5 mass % to 8 mass %, particularly preferably from 1.0 mass % to 5 mass % with respect to the total mass (100 mass %) of the ink composition. When the content of the permeable compound falls within the ranges, the embeddability (wet spreadability) and permeability of the ink into the recording medium tend to be further improved.

Examples of the moisture-retaining compound include, but not particularly limited to: polyol compounds (having 3 or more hydroxy groups) such as glycerin; and alkanediols each preferably having 3 or less carbon atoms or alkanediols including polyether backbones formed of alkylene glycols each having 3 or less carbon atoms, such as ethylene glycol, diethylene glycol, triethylene glycol, polyethylene glycol, propylene glycol, dipropylene glycol, tripropylene glycol, polypropylene glycol, and propanediol. The moisture-retaining compounds may be used alone or in combination thereof. The use of such moisture-retaining compound tends to further suppress the drying of the ink in an inkjet head to result in a further improvement in clogging recoverability.

The content of the moisture-retaining compound is preferably from 5 mass % to 30 mass %, more preferably from 10 mass % to 25 mass %, particularly preferably from 12 mass % to 23 mass % with respect to the total mass (100 mass %) of the ink composition. When the content of the moisture-retaining compound falls within the ranges, the drying of the ink in the inkjet head tends to be further suppressed to result in a further improvement in clogging recoverability.

The content of a water-soluble low-molecular weight organic compound having a normal boiling point of more than 280° C. is preferably 5 mass % or less, more preferably 3 mass % or less, still more preferably 1 mass % or less, particularly preferably 0.5 mass % or less with respect to the total mass (100 mass %) of the ink composition. The lower limit of the content of the water-soluble low-molecular weight organic compound having a normal boiling point of more than 280° C. is 0 mass %. When the content of the water-soluble low-molecular weight organic compound having a normal boiling point of more than 280° C. falls within the ranges, the composition becomes suitable for recording on a non-absorbing or low-absorbing recording medium in terms of drying property. The water-soluble low-molecular weight organic compound having a normal boiling point of more than 280° C. is, for example, glycerin.

The content of the water-soluble low-molecular weight organic compound is preferably 30 mass % or less with respect to the total mass of the ink, and a ratio of the water-soluble low-molecular weight organic compound having a normal boiling point of 210° C. or less to the total mass of the water-soluble low-molecular weight organic compound is preferably 50 mass % or more. In such case, there is a tendency that a balance between the drying property and solubility of the ink becomes excellent, and hence the abrasion resistance and the clogging recoverability become more excellent.

The content of the water-soluble low-molecular weight organic compound is preferably 30 mass % or less, more preferably 28 mass % or less, still more preferably 26 mass % or less, particularly preferably 25 mass % or less with respect to the total mass of the ink. The lower limit of the content of the water-soluble low-molecular weight organic compound is not particularly limited, but is preferably 10 mass % or more, more preferably 15 mass % or more, still more preferably 20 mass % or more.

The content of the water-soluble low-molecular weight organic compound having a normal boiling point of 210° C. or less is preferably 50 mass % or more, more preferably 60 mass % or more, still more preferably 65 mass % or more, particularly preferably 70 mass % or more with respect to the total mass of the water-soluble low-molecular weight organic compound. The upper limit of such content is not particularly limited, but is preferably 90 mass % or less, more preferably 85 mass % or less, still more preferably 80 mass % or less.

The normal boiling point of the water-soluble low-molecular weight organic compound having a normal boiling point of 210° C. or less is more preferably 150° C. or more and 210° C. or less, still more preferably 160° C. or more and 200° C. or less, particularly preferably 170° C. or more and 200° C. or less. The water-soluble low-molecular weight organic compound having a normal boiling point of 210° C. or less is, for example, propylene glycol (normal boiling point: 188° C.).

1.4 Water

The inkjet ink composition according to this embodiment is an aqueous ink including water. The term "aqueous" means that at least water is incorporated as a solvent component, and the water may be incorporated as a main solvent component. Examples of the water include waters reduced in ionic impurities, such as: pure waters, such as ion-exchanged water, ultrafiltered water, reverse osmosis water, and distilled water; and ultrapure water. In addition, the use of water sterilized by, for example, UV irradiation or the addition of hydrogen peroxide can suppress the occurrence of bacteria and fungi when the inkjet ink composition is stored for a long time period.

The content of the water in a liquid medium component is preferably 30 mass % or more, more preferably from 30 mass % to 99 mass %. Further, the content is preferably from 30 mass % to 95 mass %, more preferably from 40 mass % to 90 mass %, still more preferably from 50 mass % to 80 mass %. The liquid medium is a solvent component, such as water or a water-soluble low-molecular weight organic compound.

In addition, the content of the water is preferably 40 mass % or more, more preferably 45 mass % or more, still more preferably 50 mass % or more, particularly preferably 60 mass % or more with respect to the total mass of the ink composition. The upper limit of the water content is not particularly limited, but is, for example, preferably 99 mass % or less, more preferably 90 mass % or less, still more preferably 85 mass % or less, still further more preferably 80 mass % or less with respect to the total mass of the ink composition.

1.5 Surfactant

The inkjet ink composition according to this embodiment may include a surfactant that is not a dispersant for the above-mentioned resin particles. Examples of such surfactant include, but not particularly limited to, an acetylene glycol-based surfactant, a fluorine-based surfactant, and a silicone-based surfactant. The composition preferably includes at least one of an acetylene glycol-based surfactant or a silicone-based surfactant out of those surfactants. When the ink composition includes such surfactant, its dissolution time tends to be easily controlled within a preferred range. In addition, the surfactant tends to be easily available and to improve the embeddability of the ink composition.

The acetylene glycol-based surfactant is not particularly limited, but for example, one or more kinds selected from 2,4,7,9-tetramethyl-5-decyne-4,7-diol and alkylene oxide adducts of 2,4,7,9-tetramethyl-5-decyne-4,7-diol, and 2,4-dimethyl-5-decyn-4-ol and alkylene oxide adducts of 2,4-dimethyl-5-decyn-4-ol are preferred. Examples of commercial products of the acetylene glycol-based surfactant include, but not particularly limited to, an OLFINE 104 series and an OLFINE E series such as OLFINE E1010 (names of products manufactured by Air Products Japan, Inc.), and SURFYNOL 465 and SURFYNOL 61 (names of products manufactured by Nissin Chemical Industry Co., Ltd.). The acetylene glycol-based surfactants may be used alone or in combination thereof.

Examples of the fluorine-based surfactant include, but not particularly limited to, a perfluoroalkylsulfonic acid salt, a perfluoroalkylcarboxylic acid salt, a perfluoroalkylphosphoric acid ester, a perfluoroalkyl ethylene oxide adduct, a perfluoroalkyl betaine, and a perfluoroalkylamine oxide compound. Examples of commercial products of the fluorine-based surfactant include, but not particularly limited to: S-144 and S-145 (manufactured by Asahi Glass Co., Ltd.); FC-170C, FC-430, and Fluorad FC4430 (manufactured by Sumitomo 3M Limited); FSO, FSO-100, FSN, FSN-100, and FS-300 (manufactured by Dupont); and FT-250 and FT-251 (manufactured by NEOS Company Limited). The fluorine-based surfactants may be used alone or in combination thereof.

Examples of the silicone-based surfactant include a polysiloxane-based compound and a polyether-modified organosiloxane. Specific examples of commercial products of the silicone-based surfactant include, but not particularly limited to, BYK-306, BYK-307, BYK-333, BYK-341, BYK-345, BYK-346, BYK-347, BYK-348, and BYK-349 (which are product names, manufactured by BYK Japan KK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (which are product names, manufactured by Shin-Etsu Chemical Co., Ltd.).

The HLB of the surfactant is preferably from 6 to 15, more preferably from 7 to 14, still more preferably from 11 to 14, particularly preferably from 11 to 13. When the HLB of the surfactant falls within the ranges, the dissolution time tends to be easily controlled within a preferred range. In addition, the surfactant having a HLB within the ranges tends to be easily available and to improve the embeddability of the ink composition. The term "HLB" as used herein is the abbreviation of a hydrophile-lipophile balance, and the HLB is defined by Griffin's method.

The surface tension of the surfactant is preferably from 15 mN/m to 45 mN/m, more preferably from 17.5 mN/m to 40 mN/m, particularly preferably from 20 mN/m to 35 mN/m. When the surface tension of the surfactant falls within the above-mentioned ranges, the embeddability of the ink composition tends to be improved. The surface tension (mN/m) may be measured with a surface tensiometer (e.g., SURFACE TENSIOMETER CBVP-Z manufactured by Kyowa Interface Science Co., Ltd.) by the Wilhelmy method at a liquid temperature of 25° C.

The inkjet ink composition according to this embodiment preferably includes 1 mass % or less of the surfactant that is not a dispersant for the above-mentioned resin particles, more preferably includes 0.8 mass % or less thereof, and still more preferably includes 0.7 mass % or less thereof. When the content of such surfactant falls within the above-mentioned ranges, the abrasion resistance and the clogging recoverability tend to be more excellent. In addition, the lower limit of the content of such surfactant is not particularly limited, but is preferably 0.1 mass % or more, more preferably 0.2 mass % or more, still more preferably 0.3 mass % or more.

1.6 Other Resin

The inkjet ink composition according to this embodiment may include a resin, such as a dispersing resin or a water-soluble resin. The incorporation of the dispersing resin or the water-soluble resin tends to further improve the glossiness of an image to be obtained. Examples of the dispersing resin include, but not particularly limited to, polyvinyl alcohols, polyvinylpyrrolidones, polyacrylic acid, an acrylic acid-acrylonitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, a styrene-maleic acid copolymer, a styrene-maleic anhydride copolymer, a vinylnaphthalene-acrylic acid copolymer, a vinylnaphthalene-maleic acid copolymer, a vinyl acetate-maleic acid ester copolymer, a vinyl acetate-crotonic acid copolymer, a vinyl acetate-acrylic acid copolymer, and salts thereof. Of those, a styrene-acrylic acid copolymer is preferred. Any one of the following forms may be used as the form of the copolymer: a random copolymer, a block copolymer, an alternating copolymer, and a graft copolymer. In addition, the composition may include a wax, though an additional component is not limited thereto. Examples of the wax include a polyolefin wax such as a polyethylene wax and a paraffin wax.

When the wax is incorporated, its content is preferably from 0.01 mass % to 5 mass %, more preferably from 0.1 mass % to 3 mass %, still more preferably from 0.1 mass % to 1 mass %, particularly preferably from 0.2 mass % to 0.8 mass %, more particularly preferably from 0.3 mass % to 0.7 mass % with respect to the total mass of the ink composition.

1.7 Other Component

Various additives, such as a solubilizing agent, a viscosity modifier, a pH modifier, an antioxidant, an antiseptic, an antifungal agent, a corrosion inhibitor, and a chelating agent for capturing a metal ion that affects dispersion, may each be appropriately added to the inkjet ink composition according to this embodiment for satisfactorily maintaining its storage stability and ejection stability from a head, for alleviating its clogging, or for preventing the deterioration of the ink.

1.8 Method of Producing Inkjet Ink Composition

The inkjet ink composition according to this embodiment may be obtained by mixing the above-mentioned components (materials) in an arbitrary order and subjecting the mixture to filtration or the like as required to remove impurities. Herein, when the ink includes a pigment, the pigment is preferably mixed after having been prepared under the state of being uniformly dispersed in a solvent in advance because the pigment becomes easier to handle. When the pigment is prepared under the state of being dispersed in advance, the pigment is preferably dispersed with a dispersant such as a dispersing resin.

A method including sequentially adding the respective materials to a vessel including a stirring device, such as a mechanical stirrer or a magnetic stirrer, and stirring and mixing the materials is suitably used as a method of mixing the materials. For example, centrifugal filtration or filter filtration may be performed as required as a filtration method.

1.9 Physical Properties and the Like of Inkjet Ink Composition

The surface tension of the ink composition at 25° C. is preferably from 20 mN/m to 50 mN/m, more preferably from 20 mN/m to 40 mN/m. When the surface tension falls within the ranges, the ejection stability of the composition tends to be improved. The surface tension may be measured with a surface tensiometer (e.g., SURFACE TENSIOMETER CBVP-Z manufactured by Kyowa Interface Science Co., Ltd.) by the Wilhelmy method at a liquid temperature of 25° C.

The viscosity of the ink composition at 25° C. is preferably 20 mPa·s or less, more preferably 10 mPa·s or less. When the viscosity falls within the ranges, the ejection stability tends to be improved. The viscosity may be measured with a viscometer.

The inkjet ink composition according to this embodiment may be an ink composition to be used in an inkjet recording method to be described later or an ink composition to be used in an inkjet recording apparatus to be described later.

2. Recording Method

A recording method according to at least one embodiment of the present disclosure includes an ink adhesion step of ejecting the above-mentioned inkjet ink composition from an inkjet head to cause the composition to adhere to a recording medium.

According to the recording method of this embodiment, the above-mentioned inkjet ink composition is used, and hence the abrasion resistance of an image recorded on the recording medium is improved. In addition, the clogging recoverability of an inkjet head nozzle is improved.

The recording medium, a recording apparatus, and the respective steps are described below in the stated order.

2.1 Recording Medium

Examples of the recording medium include, but not particularly limited to, an absorbing recording medium, a low-absorbing recording medium, and a non-absorbing recording medium. According to the recording method according to this embodiment, the formation of a coating film on the surface of an image imparts abrasion resistance thereto. Accordingly, the abrasion resistance is improved in the case where the image is recorded on the low-absorbing recording medium into which the ink hardly permeates, or the non-absorbing recording medium into which the ink does not permeate as compared to the case where the image is recorded on the absorbing recording medium into which the ink permeates. Accordingly, it is advantageous to use the recording method according to this embodiment.

Examples of the absorbing recording medium include, but not particularly limited to: plain paper such as electrophotographic paper and inkjet paper, the papers each having high permeability for the ink composition; and art paper, coated paper, and cast paper to be used in general offset printing, the papers each having relatively low permeability for the ink composition. The inkjet paper is specifically, for example, paper including an ink-absorbing layer including silica particles or alumina particles, or an ink-absorbing layer including a hydrophilic polymer, such as polyvinyl alcohol (PVA) or polyvinylpyrrolidone (PVP), but is not particularly limited thereto.

The low-absorbing recording medium is, for example, coated paper having arranged on its surface a coating layer for receiving a liquid, but is not particularly limited thereto. Examples of the coated paper include, but not particularly limited to, printing papers, such as art paper, coated paper, and matt paper.

Examples of the non-absorbing recording medium include, but not particularly limited to: films and plates of plastics, such as polyvinyl chloride, polyethylene, polypropylene, and polyethylene terephthalate (PET); plates of metals, such as iron, silver, copper, and aluminum, or metal plates produced by the vapor deposition of these various metals; plastic-made films; and plates of alloys, such as stainless steel and brass.

The terms "low-absorbing recording medium" and "non-absorbing recording medium" as used herein refer to recording media each having a water absorption amount during a period from the start of contact with water to 30 msec thereafter of 10 $mL/m^2$ or less in the Bristow method. The Bristow method is a method that is most widespread as a method of measuring a liquid absorption amount over a short time period, and the method has been adopted in Japan Technical Association of the Pulp and Paper Industry (JAPAN TAPPI). Details about the test method are described in the standard No. 51 "Paper and Paperboard-Liquid Absorbency Test Method-Bristow Method" of "JAPAN TAPPI Paper Pulp Test Method, 2000."

In addition, the non-absorbing recording medium and the low-absorbing recording medium may be classified by the wettability of a recording surface to water. Each of the recording media may be characterized by, for example, dropping a water droplet having a volume of 0.5 μL onto the recording surface of the recording medium, and measuring the ratio at which its contact angle reduces (comparing the contact angle 0.5 millisecond after its impact and the contact angle 5 seconds thereafter). More specifically, as the properties of the recording media, the term "non-absorbing" of the "non-absorbing recording medium" means that the above-mentioned reduction ratio is less than 1%, and the term "low-absorbing" of the "low-absorbing recording medium" means that the above-mentioned reduction ratio is 1% or more and less than 5%. In addition, the term "absorbing" means that the above-mentioned reduction ratio is 5% or more. The contact angle may be measured with, for example, a portable contact angle meter PCA-1 (manufactured by Kyowa Interface Science Co., Ltd.).

2.2 Recording Apparatus

An inkjet recording apparatus that may be used in this embodiment preferably includes: an inkjet head that ejects the above-mentioned ink composition to a recording medium; head-heating means for heating the inkjet head; and drying means for drying the recording medium to which the ink composition has adhered.

FIG. 1 is a schematic sectional view for schematically illustrating the inkjet recording apparatus. As illustrated in FIG. 1, a recording apparatus 1 includes an inkjet head 2, an IR heater 3, a platen heater 4, a curing heater 5, a cooling fan 6, a preheater 7, and a ventilation fan 8.

The drying means accelerates the drying of the ink that has adhered to the recording medium in the surroundings of the inkjet head 2. The means is drying means in the ink adhesion step.

Examples of the drying means include means based on heating and means based on air blowing. Examples of the drying means include, but not particularly limited to, the ventilation fan 8, the IR heater 3, the platen heater 4, and the preheater 7. The ventilation fan 8 may blow warm air, or may blow normal-temperature air.

When the drying means is based on heating, the inkjet head 2 may be heated by the drying means.

For example, a case in which the inkjet head 2 is directly heated by warm air or the IR heater 3, and a case in which the inkjet head 2 is heated through the recording medium heated by the platen heater 4 are conceivable.

Alternatively, the recording apparatus may include heating means (head-heating means) for heating the inkjet head 2.

The heating of the inkjet head 2 reduces the viscosity of the ink composition in the inkjet head 2 to enable satisfactory ejection thereof.

Meanwhile, the heating of the inkjet head 2 involves a problem in that the ink composition in the inkjet head 2 receives heat to cause clogging.

The use of the IR heater 3 enables the heating of the recording medium from the inkjet head 2 side. Thus, the temperature of the recording medium can be increased without being affected by the thickness of the recording medium as compared to the case where the recording medium is heated from its rear surface by the platen heater 4 or the like, though the inkjet head 2 is liable to be simultaneously heated. In addition, the use of the platen heater 4 enables the heating of the recording medium from a side opposite to the inkjet head 2 side. Thus, the inkjet head 2 is relatively suppressed from being heated.

The recording apparatus 1 is preferably set so that when the ink composition is ejected to the recording medium to be caused to adhere thereto, the surface temperature of the recording medium may be from 20° C. to 70° C. When the above-mentioned drying means based on heating is used, the surface temperature is the surface temperature of the heated recording medium. The drying means accelerates the drying of the ink that has adhered to the recording medium to improve image quality. In addition, the drying means based on heating can more quickly dissolve the resin particles of the ink that have adhered to the recording medium to form a uniform coating film.

The recording apparatus may include post-drying means. The post-drying means heats the recording medium to which the ink composition has adhered after the ink adhesion step to dry the composition. Examples of the post-drying means include, but not particularly limited to, means, such as the curing heater 5, a warm-air mechanism (not shown), and a thermostat (not shown). When the drying means heats the recording medium having recorded thereon an image, moisture and the like in the ink composition more quickly evaporate and scatter, and hence the resin particles in the ink composition form a coating film. Thus, the ink dried product can be strongly fixed (bonded) onto the recording medium to provide a high-quality image excellent in abrasion resistance in a short time period.

The above-mentioned phrase "heat the recording medium" means that the temperature of the recording medium is increased to a desired temperature, and is not limited to the direct heating of the recording medium.

The recording apparatus 1 may include the cooling fan 6. The cooling of the ink composition on the recording medium with the cooling fan 6 after its drying tends to enable the formation of a coating film on the recording medium with satisfactory adhesiveness.

The recording apparatus 1 may include the preheater 7 that heats (preheats) the recording medium in advance before the ejection of the ink composition to the recording medium. The preheating of the recording medium before the ejection of the ink composition tends to enable the formation of a high-quality image reduced in bleeding on the recording medium, in particular, each of non-absorbing and low-absorbing recording media. A preheating temperature is preferably from 80° C. to 120° C.

The recording apparatus 1 may include the ventilation fan 8 so that the ink composition that has adhered to the recording medium may be more efficiently dried.

2.3 Respective Steps of Recording Method

Drying Step

The recording method according to this embodiment may include a drying step of drying the ink that has adhered to the recording medium with the above-mentioned drying means. The step is a step to be performed at the time of the ink adhesion step to be described later, and in the step, the ink composition that has adhered to the recording medium is immediately dried. The step is also referred to as "primary drying step." It is preferred that the adhesion of the ink to the heated recording medium be performed, and/or the drying of an ink droplet that has adhered to the recording medium through the step be started within 0.5 second after the adhesion of the ink droplet.

In particular, the method may include a step including using drying means based on heating (heating step), and such case is preferred. The step of drying the ink through heating is also referred to as "heating step." In the drying step, the heating is performed so that the upper limit of the surface temperature of the recording medium may be preferably 70° C. or less, more preferably 65° C. or less, still more preferably 60° C. or less, still further more preferably 55° C. or less, particularly preferably 53° C. or less. The upper limit is particularly preferably 50° C. or less, more preferably 45° C. or less, still more preferably 43° C. or less.

Meanwhile, the heating is performed so that the lower limit of the surface temperature of the recording medium may be preferably 20° C. or more, more preferably 30° C. or more, still more preferably 35° C. or more, still further more preferably 37° C. or more, still further more preferably 38° C. or more, particularly preferably 40° C. or more. When the surface temperature of the recording medium is 70° C. or less, there is a tendency that the heating of the inkjet head is suppressed and a nozzle failure during printing is suppressed, and hence the clogging recoverability of the nozzle is further improved. In addition, when the surface temperature of the recording medium is 20° C. or more, there is a tendency that the dots of the ink composition on the recording medium can be suppressed from gathering together to deteriorate image quality, and hence the image quality is further improved. In addition, the embeddability of each of the dots of the ink composition on the recording medium, in particular, a non-absorbing recording medium such as vinyl chloride is further improved.

When the above-mentioned recording apparatus 1 is used, the surface temperature of the recording medium may be controlled with at least one of, for example, the IR heater 3, the platen heater 4, the ventilation fan 8, or the preheater 7.

Ink Adhesion Step

The recording method according to this embodiment includes the step (ink adhesion step) of ejecting the above-mentioned inkjet ink composition from the inkjet head to cause the composition to adhere to the recording medium. For example, when the inkjet head 2 is heated with the above-mentioned head-heating means, the viscosity of the ink composition in the inkjet head 2 is reduced, and hence the clogging recoverability is improved.

Figure 2:
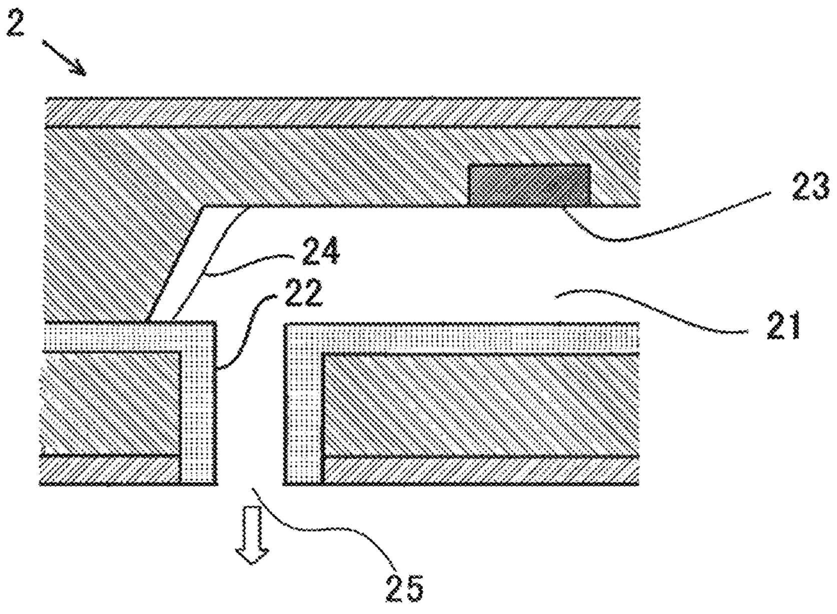
FIG. 2 is an enlarged sectional view for schematically illustrating an inkjet head.

FIG. 2 is an enlarged sectional view for schematically illustrating the inkjet head 2. The inkjet head 2 includes a pressure chamber 21 and an element 23 that applies a pressure to the ink composition in the pressure chamber 21 to eject the composition from a nozzle 22, and in the pressure chamber 21, the element 23 is arranged in a place other than a position facing the outlet through which the ink composition moves toward the nozzle 22. A case in which the element 23 is placed directly above the nozzle in consideration of the force by which the ink is pushed out of the nozzle is advantageous from the viewpoint of solving resin sticking 24, but is not preferred because of a reason in terms of head design. A case in which the element 23 is present in a place other than the place directly above the nozzle is advantageous in terms of design, and the present disclosure is particularly useful in such case. The element 23 may be formed by using, for example, an electromechanical conversion element such as a piezoelectric element that changes a cavity volume through its mechanical deformation, or an electrothermal conversion element that generates heat to produce air bubbles in the ink, to thereby eject the ink.

The position facing an outlet 25 communicating to the nozzle 22 in the pressure chamber 21 is a region defined as follows: if, in FIG. 2, lines are extended from the wall of the outlet 25 toward the upper portion of the figure, a region including the extended lines and the inside surrounded by the extended lines corresponds to the position. In the case of, for example, the head of FIG. 2, the outlet 25 is a portion having the same area in a direction perpendicular to the direction in which the ink is ejected as that of the nozzle 22. A case in which the element 23 is arranged in a place other than the position means that at least part of the element 23 is absent in at least part of the region. This case is preferred because the degree of freedom in the design of each of the piezoelectric element and the pressure chamber is high.

Recording is preferably performed for 1 hour or more without performance of a step of applying a pressure from the outside to the inkjet head 2 to discharge the ink composition from the nozzle. Herein, the pressure to be applied from the outside means suction (negative pressure) or the application of a positive pressure from the upstream side of the head, and does not mean ink discharge (flushing) by the function of the head itself. As long as the ink is not discharged by applying the pressure from the outside, the recording may not be continuous, and may be paused. In this case, a cumulative recording time is 1 hour or more. The recording time is preferably from 1 hour to 4 hours, more preferably from 2 hours to 3 hours. In such recording method, the resins of the resin particles are each brought into the state of being relatively liable to stick to the inkjet head, and hence the effect of this embodiment can be further exhibited. In addition, when the recording is performed a plurality of times, it is preferred that the step of applying the pressure from the outside to the inkjet head 2 to discharge the ink composition from the nozzle be free from being performed during the recording. Further, it is also preferred that the step of applying the pressure from the outside to the inkjet head 2 to discharge the ink composition from the nozzle be performed in at least one of a period before the recording or that after the recording. The above-mentioned cases are preferred because a recording speed can be increased, the effect of this embodiment can be further exhibited, and the ejection stability of the composition can be made more excellent.

Post-Drying Step

The recording method according to this embodiment may include a post-drying step of heating the recording medium with post-drying means after the above-mentioned ink adhesion step. The post-drying step is also referred to as "secondary drying step." The surface temperature of the recording medium in the post-drying step is preferably from 50° C. to 110° C. Thus, the resin particles in the ink composition on the recording medium can be dissolved to form a recorded product having satisfactory embeddability. The surface temperature of the recording medium in the post-drying step is preferably 55° C. or more and 100° C. or less, more preferably 55° C. or more and 90° C. or less, still more preferably 60° C. or more and 80° C. or less, particularly preferably 65° C. or more and 75° C. or less. It is also preferred that the highest attainable temperature of the recording medium in a post-heating step be set within the above-mentioned ranges. When a drying temperature falls within the ranges, the abrasion resistance of an image tends to be further improved.

3. Examples

The present disclosure is described below more specifically by way of Examples, but the present disclosure is not limited to these examples. In the following description, the term "%" means "mass %" unless otherwise stated.

3.1 Production of Composite Resin Particles

Production Example 1 of Resin Particles 1

350 Grams of ion-exchanged water and 0.25 g of a surfactant shown in Table 1 below were loaded into a reaction vessel including a stirring machine, a reflux condenser, a dropping device, and a temperature gauge, and a temperature in the vessel was increased to 70° C. while the inside of the vessel was purged with nitrogen under stirring. While the inner temperature was kept at 70° C., 2 g of potassium persulfate was added as a polymerization initiator to be dissolved in the mixture. After that, an emulsified product produced in advance by adding 40 g of ion-exchanged water, 0.25 g of the surfactant shown in Table 1 below, 79 g of methyl methacrylate, 8 g of styrene, 11 g of butyl acrylate, 1 g of methacrylic acid, and 1 g of acrylamide under stirring was continuously dropped into the reaction solution over 3 hours (first resin). After the completion of the dropping, aging was performed for 1 hour. After the completion of the aging, an emulsified product produced in advance by adding 80 g of ion-exchanged water, 0.25 g of the surfactant shown in Table 1 below, 81 g of styrene, 15 g of 2-ethylhexyl methacrylate, 2 g of methacrylic acid, and 2 g of acrylamide under stirring was continuously dropped into the reaction solution over 4 hours (second resin). After the completion of the dropping, aging was performed for 3 hours. The resultant aqueous emulsion was cooled to normal temperature, and then ion-exchanged water and a neutralizer shown in Table 1 below were added to adjust its solid content and pH to 30 wt % and 8, respectively. The resultant particles each had a core-shell structure.

Production Example 2 of Resin Particles 26

Resin particles were prepared with reference to Example 3 of WO 2019/143341 (A1).

470 Grams of ion-exchanged water and 0.22 g of AQUALON AR-10 (product name, manufactured by DKS Co., Ltd., polyoxyethylene styrenated propenyl phenyl ether sulfuric acid ester ammonium salt) were loaded into a reaction vessel including a stirring machine, a reflux condenser, a dropping device, and a temperature gauge, and a temperature in the vessel was increased to 77° C. while the inside of the vessel was purged with nitrogen under stirring. While the inner temperature was kept at 77° C., 0.6 g of potassium persulfate was added as a polymerization initiator to be dissolved in the mixture. After that, an emulsified product produced in advance by adding 30 g of ion-exchanged water, 1 g of AQUALON AR-10, 34.6 g of methyl methacrylate, 64 g of butyl acrylate, and 1.4 g of methacrylic acid under stirring, and a dissolved liquid obtained by adding 0.3 g of potassium persulfate to 14 g of ion-exchanged water were each continuously dropped into the reaction solution over 6 hours (first resin). After the completion of the dropping, aging was performed for 1 hour. After the completion of the aging, an emulsified product produced in advance by adding 85 g of ion-exchanged water, 1.2 g of AQUALON AR-10, 140.5 g of cyclohexyl methacrylate, 19.8 g of cyclohexyl acrylate, 28.3 g of 2-phenoxyethyl methacrylate, and 8.1 g of methacrylic acid under stirring was continuously dropped into the reaction solution over 4 hours (second resin). After the completion of the dropping, aging was performed for 1 hour. The temperature of the aged product was increased to 85° C., and 3.3 g of cyclohexyl acrylate was added thereto, followed by aging for 1 hour. The aged product was cooled to 70° C., and then 13 g of a 5% aqueous solution of ascorbic acid and 26 g of a 5% aqueous solution of tert-butyl hydroperoxide were added thereto, followed by aging for 1 hour. The resultant aqueous emulsion was cooled to normal temperature, and then ion-exchanged water and an aqueous solution of potassium hydroxide were added to adjust its solid content and pH to about 30 wt % and 8, respectively. The resultant particles each had a sea-island structure.

Resin particles each having a core-shell structure, the particles having, for example, the physical property values of resin particles 2 to 20 and 22 to 25 shown in Table 1 below, were produced on the basis of the production example 1 of the resin particles 1 described above while the kinds and masses of the respective monomers used, and the kinds of the surfactant and the neutralizer used were adjusted. Resin particles each having a single structure, the particles having, for example, the physical property values of resin particles 21 shown in Table 1 below, were produced on the basis of the production example 1 of the resin particles 1 described above. Resin particles each having a sea-island structure, the particles having, for example, the physical property values of resin particles 27 shown in Table 1 below, were produced on the basis of the production example 2 of the resin particles 26 described above while the mass of the surfactant used was adjusted. The glass transition temperatures Tg (° C.) of the respective resins of the resultant composite resin particles were each calculated as described above.

The monomers used in the preparation of the respective resin particles are shown in Table 2.

In addition, the average particle diameters (nm) of the composite resin particles obtained in the foregoing were determined by measuring the particle diameters of the composite resin particles with Nanotrac WAVE II (manufactured by MicrotracBEL Corp.). Further, the root sum square $\delta ph=\sqrt{(\delta p^2+\delta h^2)}$ of the polar component δp and hydrogen-bonding component δh of Hansen solubility parameters, and an acid value in each of the composite resin particles were each determined in accordance with a method described in the above-mentioned section "1. Inkjet Ink Composition." The mass ratio of the first resin to the second resin was determined from the masses of the monomers used at the time of the production of each of the composite resin particles.

TABLE 1

| | Composite resin particles | | | | | | | | | | Evaluation result | |
|---|---|---|---|---|---|---|---|---|---|---|---|---|
| Resin name | Average particle diameter (nm) | Resin mass ratio w1/w2 | δph1 of first resin ($MPa^{1/2}$) | δph2 of second resin ($MPa^{1/2}$) | Weighted average δph ($MPa^{1/2}$) | Tg of first resin (° C.) | Tg of second resin (° C.) | Acid value of second resin (mgKOH/g) | Surfactant | Neutralizer | Abrasion resistance | Clogging recoverability |
| Resin particles 1 | 144 | 1/1 | 4.6 | 2.9 | 3.7 | 67 | 84 | 13 | a | $NH_3$ | A | A |
| Resin particles 2 | 135 | 1/1.8 | 4.6 | 2.9 | 3.5 | 67 | 84 | 13 | a | $NH_3$ | A | A |
| Resin particles 3 | 137 | 1/2 | 4.6 | 2.9 | 3.4 | 67 | 84 | 13 | a | $NH_3$ | B | AA |
| Resin particles 4 | 143 | 1/3 | 4.6 | 2.9 | 3.3 | 67 | 84 | 13 | a | $NH_3$ | C | AA |
| Resin particles 5 | 137 | 1/0.5 | 4.6 | 2.9 | 4.0 | 67 | 84 | 13 | a | $NH_3$ | A | B |
| Resin particles 6 | 144 | 1/0.33 | 4.6 | 2.9 | 4.1 | 67 | 84 | 13 | a | $NH_3$ | AA | B |
| Resin particles 7 | 139 | 1/1 | 4.2 | 2.9 | 3.6 | 70 | 84 | 13 | a | $NH_3$ | B | A |
| Resin particles 8 | 158 | 1/1 | 4.6 | 3.4 | 4.0 | 67 | 71 | 13 | a | $NH_3$ | A | B |
| Resin particles 9 | 159 | 1/1 | 4.6 | 3.4 | 4.0 | 67 | 75 | 26 | a | $NH_3$ | B | B |
| Resin particles 10 | 139 | 1/1 | 4.6 | 2.9 | 3.7 | 67 | 84 | 13 | b | $NH_3$ | B | A |
| Resin particles 11 | 141 | 1/1 | 4.6 | 2.9 | 3.7 | 67 | 84 | 13 | — | $NH_3$ | A | B |
| Resin particles 12 | 200 | 1/1 | 4.6 | 2.9 | 3.7 | 67 | 84 | 13 | a | $NH_3$ | B | A |
| Resin particles 13 | 111 | 1/1 | 4.6 | 2.9 | 3.7 | 67 | 84 | 13 | a | $NH_3$ | AA | B |
| Resin particles 14 | 156 | 1/1 | 4.6 | 2.9 | 3.7 | 67 | 84 | 13 | a | $NH_3$/NaOH | A | A |
| Resin particles 15 | 161 | 1/1 | 4.6 | 2.9 | 3.7 | 67 | 84 | 13 | a | TEA | A | A |
| Resin particles 16 | 166 | 1/1 | 4.6 | 2.9 | 3.7 | 67 | 84 | 13 | a | NaOH | B | A |
| Resin particles 17 | 145 | 1/1 | 4.6 | 2.9 | 3.7 | 67 | 84 | 13 | c | $NH_3$ | A | A |
| Resin particles 18 | 144 | 1/1 | 4.6 | 2.9 | 3.7 | 67 | 84 | 13 | d | $NH_3$ | A | A |
| Resin particles 19 | 130 | 1/1 | 4.6 | 2.9 | 3.7 | 67 | 84 | 13 | e | $NH_3$ | A | A |
| Resin particles 20 | 129 | 1/1 | 4.6 | 2.9 | 3.7 | 67 | 84 | 13 | f | $NH_3$ | A | A |
| Resin particles 21 | 77 | 1/0 | 4.6 | — | 4.6 | 67 | — | 6.5 | a | $NH_3$ | AA | C |
| Resin particles 22 | 150 | 1/1 | 4.9 | 2.9 | 3.9 | 67 | 84 | 13 | a | $NH_3$ | AA | C |
| Resin particles 23 | 140 | 1/1 | 3.8 | 2.9 | 3.3 | 75 | 84 | 13 | a | $NH_3$ | D | A |
| Resin particles 24 | 152 | 1/1 | 4.6 | 3.7 | 4.1 | 67 | 68 | 26 | a | $NH_3$ | B | C |
| Resin particles 25 | 135 | 1/1 | 4.6 | 2.6 | 3.6 | 67 | 104 | 26 | a | $NH_3$ | B | C |
| Resin particles 26 | 136 | 1/2 | 4.6 | 4.3 | 4.4 | 10 | 105 | 26 | c | KOH | D | C |
| Resin particles 27 | 200 | 1/2 | 4.6 | 4.3 | 4.4 | 10 | 105 | 26 | c | KOH | D | C |

TABLE 2

| | First resin | | | | | | | Second resin | | | | | | | | |
|---|---|---|---|---|---|---|---|---|---|---|---|---|---|---|---|---|
| Resin name | MMA (g) | ST (g) | BA (g) | MAA g) | AAM (g) | AN (g) | Total (g) | ST (g) | 2EHMA g | MAA (g) | AAM (g) | AN (g) | CHMA (g) | CHA (g) | PHOEMA (g) | Total (g) |
| Resin particles 1 | 79 | 8 | 11 | 1 | 1 | | 100 | 81 | 15 | 2 | 2 | | | | | 100 |
| Resin particles 2 | 79 | 8 | 11 | 1 | 1 | | 100 | 145.8 | 27 | 3.6 | 3.6 | | | | | 180 |
| Resin particles 3 | 79 | 8 | 11 | 1 | 1 | | 100 | 162 | 30 | 4 | 4 | | | | | 200 |
| Resin particles 4 | 79 | 8 | 11 | 1 | 1 | | 100 | 243 | 45 | 6 | 6 | | | | | 300 |
| Resin particles 5 | 79 | 8 | 11 | 1 | 1 | | 100 | 40.5 | 75 | 1 | 1 | | | | | 50 |
| Resin particles 6 | 79 | 8 | 11 | 1 | 1 | | 100 | 26.7 | 5 | 0.65 | 0.65 | | | | | 33 |
| Resin particles 7 | 66 | 21 | 11 | 1 | 1 | | 100 | 81 | 15 | 2 | 2 | | | | | 100 |
| Resin particles 8 | 79 | 8 | 11 | 1 | 1 | | 100 | 66.5 | 25.5 | 2 | 2 | 4 | | | | 100 |
| Resin particles 9 | 79 | 8 | 11 | 1 | 1 | | 100 | 70.5 | 21.5 | 4 | 4 | | | | | 100 |
| Resin particles 10 | 79 | 8 | 11 | 1 | 1 | | 100 | 81 | 15 | 2 | 2 | | | | | 100 |
| Resin particles 11 | 79 | 8 | 11 | 1 | 1 | | 100 | 81 | 15 | 2 | 2 | | | | | 100 |
| Resin particles 12 | 79 | 8 | 11 | 1 | 1 | | 100 | 81 | 15 | 2 | 2 | | | | | 100 |
| Resin particles 13 | 79 | 8 | 11 | 1 | 1 | | 100 | 81 | 15 | 2 | 2 | | | | | 100 |
| Resin particles 14 | 79 | 8 | 11 | 1 | 1 | | 100 | 81 | 15 | 2 | 2 | | | | | 100 |
| Resin particles 15 | 79 | 8 | 11 | 1 | 1 | | 100 | 81 | 15 | 2 | 2 | | | | | 100 |
| Resin particles 16 | 79 | 8 | 11 | 1 | 1 | | 100 | 81 | 15 | 2 | 2 | | | | | 100 |
| Resin particles 17 | 79 | 8 | 11 | 1 | 1 | | 100 | 81 | 15 | 2 | 2 | | | | | 100 |
| Resin particles 18 | 79 | 8 | 11 | 1 | 1 | | 100 | 81 | 15 | 2 | 2 | | | | | 100 |
| Resin particles 19 | 79 | 8 | 11 | 1 | 1 | | 100 | 81 | 15 | 2 | 2 | | | | | 100 |
| Resin particles 20 | 79 | 8 | 11 | 1 | 1 | | 100 | 81 | 15 | 2 | 2 | | | | | 100 |
| Resin particles 21 | 79 | 8 | 11 | 1 | 1 | | 100 | | | | | | | | | 0 |
| Resin particles 22 | 79 | 4 | 11 | 1 | 1 | 4 | 100 | 81 | 15 | 2 | 2 | | | | | 100 |
| Resin particles 23 | 45 | 42 | 11 | 1 | 1 | | 100 | 81 | 15 | 2 | 2 | | | | | 100 |
| Resin particles 24 | 79 | 8 | 11 | 1 | 1 | | 100 | 63.5 | 26.5 | 4 | 4 | 2 | | | | 100 |
| Resin particles 25 | 79 | 8 | 11 | 1 | 1 | | 100 | 97 | | 2 | 1 | | | | | 100 |
| Resin particles 26 | 34.6 | | 64 | 1.4 | | | 100 | | | 8.1 | | | 140.5 | 23.1 | 28.3 | 200 |
| Resin particles 27 | 34.6 | | 64 | 1.4 | | | 100 | | | 8.1 | | | 140.5 | 23.1 | 28.3 | 200 |

Supplementary description is given for Table 1 above.

The column "Resin mass ratio w1/w2" shows the mass ratio (first resin/second resin) of the first resin to the second resin.

Surfactant

Surfactant "a": ADEKA REASOAP SR-10 (product name, manufactured by ADEKA Corporation, α-[2-[(allyloxy)-1-(alkyloxymethyl)]ethyl]-ω-polyoxyethylene sulfuric acid ester ammonium salt), reactive surfactant Surfactant "b": sodium lauryl sulfate, nonreactive surfactant Surfactant "c": AQUALON AR-10 (product name, manufactured by DKS Co. Ltd., polyoxyethylene styrenated propenyl phenyl ether sulfuric acid ester ammonium salt), reactive surfactant Surfactant "d": AQUALON KH-10 (product name, manufactured by DKS Co. Ltd., polyoxyethylene-1-(allyloxymethyl) alkyl ether sulfuric acid ester ammonium salt), reactive surfactant Surfactant "e": AQUALON KH-05 (product name, manufactured by DKS Co. Ltd., polyoxyethylene-1-(allyloxymethyl) alkyl ether sulfuric acid ester ammonium salt), reactive surfactant Surfactant "f": LATEMUL PD-104 (product name, manufactured by Kao Corporation, polyoxyalkylene alkenyl ether sulfuric acid ammonium salt), reactive surfactant Neutralizer TEA: triethanolamine $NH_3$: ammonia NaOH: sodium hydroxide KOH: potassium hydroxide The term "$NH_3$/NaOH" in Table 1 means that ammonia and sodium hydroxide are used in combination (as a mixed solution containing ammonia and sodium hydroxide at a molar ratio of 1:1).

The monomers used in the preparation of the respective resin particles shown in Table 2 are described below.

First and Second Resins

MMA: methyl methacrylate

ST: styrene

BA: n-butyl acrylate

MAA: methacrylic acid

AAM: acrylamide

AN: acrylonitrile

2EHMA: 2-ethylhexyl methacrylate

CHMA: cyclohexyl methacrylate

CHA: cyclohexyl acrylate

PHOEMA: phenoxyethyl methacrylate 3.2 Preparation of Inkjet Ink Compositions

Respective materials were mixed so that composition shown in each of Table 3 below to Table 5 below was obtained, followed by sufficient stirring. Thus, aqueous inkjet ink compositions were obtained. In the following tables, numerical values are each represented in the unit of mass %, and the total of numerical values in each column is 100 mass %.

TABLE 3

| | | | Ink A | Ink B | Ink C | Ink D | Ink E | Ink F | Ink G | Ink H | Ink I | Ink J | Ink K | Ink L | Ink M |
|---|---|---|---|---|---|---|---|---|---|---|---|---|---|---|---|
| Specific water-soluble low-molecular weight organic compound (normal boiling point: from 215° C. to 290° C.) | Amide | CPL (boiling point: 267° C.) | 3 | 3 | 3 | 3 | 3 | 3 | 3 | 3 | 3 | 3 | 3 | 3 | 3 |
| | | 2P (boiling point: 245° C.) | | | | | | | | | | | | | |
| | | DMPA (boiling point: 215° C.) | | | | | | | | | | | | | |
| Water-soluble low-molecular weight organic compound (normal boiling point: 210° C. or less) | Alkane-diol | PG (boiling point: 188° C.) | 18 | 18 | 18 | 18 | 18 | 18 | 18 | 18 | 18 | 18 | 18 | 18 | 18 |
| Water-soluble low-molecular weight organic compound (others) | Alkane-diol | 1,2HD (boiling point: 224° C.) | 2 | 2 | 2 | 2 | 2 | 2 | 2 | 2 | 2 | 2 | 2 | 2 | 2 |
| | Alkane-diol | 1,3PD (boiling point: 214° C.) | | | | | | | | | | | | | |
| | Amide | HEP (boiling point: 309° C.) | | | | | | | | | | | | | |
| Surfactant | Silicone-based | BYK-348 | 0.5 | 0.5 | 0.5 | 0.5 | 0.5 | 0.5 | 0.5 | 0.5 | 0.5 | 0.5 | 0.5 | 0.5 | 0.5 |
| Pigment-dispersed liquid | | Cyan pigment (effective component) | 2 | 2 | 2 | 2 | 2 | 2 | 2 | 2 | 2 | 2 | 2 | 2 | 2 |
| Acrylic resin particles | | Resin particles 1 (effective component) | 6 | | | | | | | | | | | | |
| | | Resin particles 2 (effective component) | | 6 | | | | | | | | | | | |
| | | Resin particles 3 (effective component) | | | 6 | | | | | | | | | | |
| | | Resin particles 4 (effective component) | | | | 6 | | | | | | | | | |
| | | Resin particles 5 (effective component) | | | | | 6 | | | | | | | | |
| | | Resin particles 6 (effective component) | | | | | | 6 | | | | | | | |
| | | Resin particles 7 (effective component) | | | | | | | 6 | | | | | | |
| | | Resin | | | | | | | | 6 | | | | | |

TABLE 3-continued

| | Ink A | Ink B | Ink C | Ink D | Ink E | Ink F | Ink G | Ink H | Ink I | Ink J | Ink K | Ink L | Ink M |
|---|---|---|---|---|---|---|---|---|---|---|---|---|---|
| particles 8 (effective component) | | | | | | | | | | | | | |
| Resin particles 9 (effective component) | | | | | | | | | 6 | | | | |
| Resin particles 10 (effective component) | | | | | | | | | | 6 | | | |
| Resin particles 11 (effective component) | | | | | | | | | | | 6 | | |
| Resin particles 12 (effective component) | | | | | | | | | | | | 6 | |
| Resin particles 13 (effective component) | | | | | | | | | | | | | 6 |
| Resin particles 14 (effective component) | | | | | | | | | | | | | |
| Resin particles 15 (effective component) | | | | | | | | | | | | | |
| Resin particles 16 (effective component) | | | | | | | | | | | | | |
| Resin particles 17 (effective component) | | | | | | | | | | | | | |
| Resin particles 18 (effective component) | | | | | | | | | | | | | |
| Resin particles 19 (effective component) | | | | | | | | | | | | | |
| Resin particles 20 (effective component) | | | | | | | | | | | | | |
| Resin particles 21 (effective component) | | | | | | | | | | | | | |
| Resin particles 22 (effective component) | | | | | | | | | | | | | |
| Resin particles 23 (effective component) | | | | | | | | | | | | | |
| Resin particles 24 (effective component) | | | | | | | | | | | | | |
| Resin particles 25 (effective component) | | | | | | | | | | | | | |
| Resin particles 26 (effective component) | | | | | | | | | | | | | |

TABLE 3-continued

| | | | Ink A | Ink B | Ink C | Ink D | Ink E | Ink F | Ink G | Ink H | Ink I | Ink J | Ink K | Ink L | Ink M |
|---|---|---|---|---|---|---|---|---|---|---|---|---|---|---|---|
| | | Resin particles 27 (effective component) | | | | | | | | | | | | | |
| Wax | Poly-olefin-based | AQUACER 515 (effective component) | 0.5 | 0.5 | 0.5 | 0.5 | 0.5 | 0.5 | 0.5 | 0.5 | 0.5 | 0.5 | 0.5 | 0.5 | 0.5 |
| Pure water | | | Bal-ance | Bal-ance | Bal-ance | Bal-ance | Bal-ance | Bal-ance | Bal-ance | Bal-ance | Bal-ance | Bal-ance | Bal-ance | Bal-ance | Bal-ance |
| Total | | | 100 | 100 | 100 | 100 | 100 | 100 | 100 | 100 | 100 | 100 | 100 | 100 | 100 |
| Total of water-soluble low-molecular weight organic compounds | | | 23 | 23 | 23 | 23 | 23 | 23 | 23 | 23 | 23 | 23 | 23 | 23 | 23 |
| Ratio of compound having normal boiling point of 210° C. or less out of water-soluble low-molecular weight organic compounds | | | 78% | 78% | 78% | 78% | 78% | 78% | 78% | 78% | 78% | 78% | 78% | 78% | 78% |

TABLE 4

| | | | Ink N | Ink O | Ink P | Ink Q | Ink R | Ink S | Ink T | Ink U | Ink V | Ink W | Ink X | Ink Y | Ink Z |
|---|---|---|---|---|---|---|---|---|---|---|---|---|---|---|---|
| Specific water-soluble low-molecular weight organic compound (normal boiling point: from 215° C. to 290° C.) | Amide | CPL (boiling point: 267° C.) | 3 | 3 | 3 | 3 | 3 | 3 | 3 | 8 | 1 | 1 | | | 3 |
| | | 2P (boiling point: 245° C.) | | | | | | | | | | | 3 | | |
| | | DMPA (boiling point: 215° C.) | | | | | | | | | | | | 3 | |
| Water-soluble low-molecular weight organic compound (normal boiling point: 210° C. or less) | Alkane-diol | PG (boiling point: 188° C.) | 18 | 18 | 18 | 18 | 18 | 18 | 18 | 18 | 18 | 18 | 18 | 18 | 23 |
| Water-soluble low-molecular weight organic compound (others) | Alkane-diol | 1,2HD (boiling point: 224° C.) | 2 | 2 | 2 | 2 | 2 | 2 | 2 | 2 | 2 | 2 | 2 | 2 | 2 |
| | Alkane-diol | 1,3PD (boiling point: 214° C.) | | | | | | | | | | | | | |
| | Amide | HEP (boiling point: 309° C.) | | | | | | | | | | | | | |
| Surfactant | Silicone-based | BYK-348 | 0.5 | 0.5 | 0.5 | 0.5 | 0.5 | 0.5 | 0.5 | 0.5 | 0.5 | 0.5 | 0.5 | 0.5 | 0.5 |
| Pigment-dispersed liquid | | Cyan pigment (effective component) | 2 | 2 | 2 | 2 | 2 | 2 | 2 | 2 | 2 | 2 | 2 | 2 | 2 |
| Acrylic resin particles | | Resin particles 1 (effective component) | | | | | | | | 6 | 6 | | 6 | 6 | 6 |
| | | Resin particles 2 (effective component) | | | | | | | | | | 6 | | | |
| | | Resin particles 3 (effective component) | | | | | | | | | | | | | |
| | | Resin particles 4 (effective component) | | | | | | | | | | | | | |
| | | Resin particles 5 (effective component) | | | | | | | | | | | | | |

TABLE 4-continued

| | Ink N | Ink O | Ink P | Ink Q | Ink R | Ink S | Ink T | Ink U | Ink V | Ink W | Ink X | Ink Y | Ink Z |
|---|---|---|---|---|---|---|---|---|---|---|---|---|---|
| Resin particles 6 (effective component) | | | | | | | | | | | | | |
| Resin particles 7 (effective component) | | | | | | | | | | | | | |
| Resin particles 8 (effective component) | | | | | | | | | | | | | |
| Resin particles 9 (effective component) | | | | | | | | | | | | | |
| Resin particles 10 (effective component) | | | | | | | | | | | | | |
| Resin particles 11 (effective component) | | | | | | | | | | | | | |
| Resin particles 12 (effective component) | | | | | | | | | | | | | |
| Resin particles 13 (effective component) | | | | | | | | | | | | | |
| Resin particles 14 (effective component) | 6 | | | | | | | | | | | | |
| Resin particles 15 (effective component) | | 6 | | | | | | | | | | | |
| Resin particles 16 (effective component) | | | 6 | | | | | | | | | | |
| Resin particles 17 (effective component) | | | | 6 | | | | | | | | | |
| Resin particles 18 (effective component) | | | | | 6 | | | | | | | | |
| Resin particles 19 (effective component) | | | | | | 6 | | | | | | | |
| Resin particles 20 (effective component) | | | | | | | 6 | | | | | | |
| Resin particles 21 (effective component) | | | | | | | | | | | | | |
| Resin particles 22 (effective component) | | | | | | | | | | | | | |
| Resin particles 23 (effective component) | | | | | | | | | | | | | |
| Resin particles 24 (effective component) | | | | | | | | | | | | | |

TABLE 4-continued

| | | | Ink N | Ink O | Ink P | Ink Q | Ink R | Ink S | Ink T | Ink U | Ink V | Ink W | Ink X | Ink Y | Ink Z |
|---|---|---|---|---|---|---|---|---|---|---|---|---|---|---|---|
| | | Resin particles 25 (effective component) | | | | | | | | | | | | | |
| | | Resin particles 26 (effective component) | | | | | | | | | | | | | |
| | | Resin particles 27 (effective component) | | | | | | | | | | | | | |
| Wax | Poly-olefin-based | AQUACER 515 (effective component) | 0.5 | 0.5 | 0.5 | 0.5 | 0.5 | 0.5 | 0.5 | 0.5 | 0.5 | 0.5 | 0.5 | 0.5 | 0.5 |
| Pure water | | | Bal-ance | Bal-ance | Bal-ance | Bal-ance | Bal-ance | Bal-ance | Bal-ance | Bal-ance | Bal-ance | Bal-ance | Bal-ance | Bal-ance | Bal-ance |
| Total | | | 100 | 100 | 100 | 100 | 100 | 100 | 100 | 100 | 100 | 100 | 100 | 100 | 100 |
| Total of water-soluble low-molecular weight organic compounds | | | 23 | 23 | 23 | 23 | 23 | 23 | 23 | 28 | 21 | 21 | 23 | 23 | 28 |
| Ratio of compound having normal boiling point of 210° C. or less out of water-soluble low-molecular weight organic compounds | | | 78% | 78% | 78% | 78% | 78% | 78% | 78% | 64% | 86% | 86% | 78% | 78% | 82% |

TABLE 5

| | | | Ink AA | Ink AB | Ink AC | Ink AD | Ink AE | Ink AF | Ink AG | Ink AH | Ink AI | Ink AJ | Ink AK | Ink AL | Ink AM | Ink AN |
|---|---|---|---|---|---|---|---|---|---|---|---|---|---|---|---|---|
| Specific water-soluble low-molecular weight organic compound (normal boiling point: from 215° C. to 290° C.) | Amide | CPL (boiling point: 267° C.) | 3 | 3 | 3 | 3 | 3 | 3 | 3 | 3 | 3 | 3 | 11 | | 0.3 | |
| | | 2P (boiling point: 245° C.) | | | | | | | | | | | | | | |
| | | DMPA (boiling point: 215° C.) | | | | | | | | | | | | | | |
| Water-soluble low-molecular weight organic compound (normal boiling point: 210° C. or less) | Alkane-diol | PG (boiling point: 188° C.) | 11 | 10 | 18 | 18 | 18 | 18 | 18 | 18 | 18 | 18 | 18 | 18 | 18 | 18 |
| Water-soluble low-molecular weight organic compound (others) | Alkane-diol | 1,2HD (boiling point: 224° C.) | 2 | 2 | 2 | 2 | 2 | 2 | 2 | 2 | 2 | 2 | 2 | 2 | 2 | 2 |
| | Alkane-diol | 1,3PD (boiling point: 214° C.) | 7 | | | | | | | | | | | | | |
| | Amide | HEP (boiling point: 309° C.) | | | | | | | | | | | | | | 3 |
| Surfactant | Sili-cone-based | BYK-348 | 0.5 | 0.5 | 1 | 0.5 | 0.5 | 0.5 | 0.5 | 0.5 | 0.5 | 0.5 | 0.5 | 0.5 | 0.5 | 0.5 |
| Pigment-dispersed liquid | | Cyan pigment (effective component) | 2 | 2 | 2 | 2 | 2 | 2 | 2 | 2 | 2 | 2 | 2 | 2 | 2 | 2 |
| Acrylic resin particles | | Resin particles 1 (effective component) | 6 | 6 | 6 | | | | | | | | 6 | 6 | 6 | 6 |

TABLE 5-continued

| | Ink AA | Ink AB | Ink AC | Ink AD | Ink AE | Ink AF | Ink AG | Ink AH | Ink AI | Ink AJ | Ink AK | Ink AL | Ink AM | Ink AN |
|---|---|---|---|---|---|---|---|---|---|---|---|---|---|---|
| Resin particles 2 (effective component) | | | | | | | | | | | | | | |
| Resin particles 3 (effective component) | | | | | | | | | | | | | | |
| Resin particles 4 (effective component) | | | | | | | | | | | | | | |
| Resin particles 5 (effective component) | | | | | | | | | | | | | | |
| Resin particles 6 (effective component) | | | | | | | | | | | | | | |
| Resin particles 7 (effective component) | | | | | | | | | | | | | | |
| Resin particles 8 (effective component) | | | | | | | | | | | | | | |
| Resin particles 9 (effective component) | | | | | | | | | | | | | | |
| Resin particles 10 (effective component) | | | | | | | | | | | | | | |
| Resin particles 11 (effective component) | | | | | | | | | | | | | | |
| Resin particles 12 (effective component) | | | | | | | | | | | | | | |
| Resin particles 13 (effective component) | | | | | | | | | | | | | | |
| Resin particles 14 (effective component) | | | | | | | | | | | | | | |
| Resin particles 15 (effective component) | | | | | | | | | | | | | | |
| Resin particles 16 (effective component) | | | | | | | | | | | | | | |
| Resin particles 17 (effective component) | | | | | | | | | | | | | | |
| Resin particles 18 (effective component) | | | | | | | | | | | | | | |
| Resin particles 19 (effective component) | | | | | | | | | | | | | | |
| Resin particles 20 (effective component) | | | | | | | | | | | | | | |

TABLE 5-continued

| | | | Ink AA | Ink AB | Ink AC | Ink AD | Ink AE | Ink AF | Ink AG | Ink AH | Ink AI | Ink AJ | Ink AK | Ink AL | Ink AM | Ink AN |
|---|---|---|---|---|---|---|---|---|---|---|---|---|---|---|---|---|
| | | Resin particles 21 (effective component) | | | | 6 | | | | | | | | | | |
| | | Resin particles 22 (effective component) | | | | | 6 | | | | | | | | | |
| | | Resin particles 23 (effective component) | | | | | | 6 | | | | | | | | |
| | | Resin particles 24 (effective component) | | | | | | | 6 | | | | | | | |
| | | Resin particles 25 (effective component) | | | | | | | | 6 | | | | | | |
| | | Resin particles 26 (effective component) | | | | | | | | | 6 | | | | | |
| | | Resin particles 27 (effective component) | | | | | | | | | | 6 | | | | |
| Wax | Poly-olefin-based | AQUACER 515 (effective component) | 0.5 | 0.5 | 0.5 | 0.5 | 0.5 | 0.5 | 0.5 | 0.5 | 0.5 | 0.5 | 0.5 | 0.5 | 0.5 | 0.5 |
| Pure water | | | Bal-ance | Bal-ance | Bal-ance | Bal-ance | Bal-ance | Bal-ance | Bal-ance | Bal-ance | Bal-ance | Bal-ance | Bal-ance | Bal-ance | Bal-ance | Bal-ance |
| Total | | | 100 | 100 | 100 | 100 | 100 | 100 | 100 | 100 | 100 | 100 | 100 | 100 | 100 | 100 |
| Total of water-soluble low-molecular weight organic compounds | | | 23 | 15 | 23 | 23 | 23 | 23 | 23 | 23 | 23 | 23 | 31 | 20 | 20.3 | 23 |
| Ratio of compound having normal boiling point of 210° C. or less out of water-soluble low-molecular weight organic compounds | | | 48% | 67% | 78% | 78% | 78% | 78% | 78% | 78% | 78% | 78% | 58% | 90% | 89% | 78% |

Supplementary description is given for Table 3 above to Table 5 above.

- CPL (ε-caprolactam, average molecular weight: 113.16, solid when obtained as a simple substance at normal temperature)
- 2P (2-pyrrolidone, average molecular weight: 85.11, liquid when obtained as a simple substance at normal temperature)
- DMPA (3-methoxy-N,N-dimethylpropanamide, average molecular weight: 131.18, liquid when obtained as a simple substance at normal temperature)
- PG (propylene glycol)
- 1,2HD (1,2-hexanediol)
- 1,3PD (1,3-propanediol)
- HEP (N-hydroxyethyl-2-pyrrolidone)
- BYK-348 (manufactured by BYK Japan KK, silicone-based surfactant)
- AQUACER 515 (manufactured by BYK Japan KK, polyethylene-based wax emulsion)

3.3 Evaluation Method

Inkjet Recording Method

An inkjet printer (reconstructed machine of a product available under the product name "SC-R5050" from Seiko Epson Corporation) including a platen heater and the inkjet head illustrated in FIG. 2 was used as a recording apparatus. Each of the inkjet ink compositions prepared in the foregoing was loaded into the two adjacent nozzle rows of the nozzle rows (one nozzle row had 400 nozzles at a nozzle density of 300 npi) of the head of the recording apparatus, and was ejected onto Orajet 3165G-010 (ORAFOL Japan Inc., vinyl chloride film) to print a cyan solid pattern at a resolution of 1,200 dpi long by 1,200 dpi wide in an ink adhesion amount of 12 mg/inch$^2$ so that the number of scans became 8. As the primary drying (drying step) of a recording medium in a place to be subjected to ink adhesion during the printing, the platen heater was operated at such setting that the surface temperature of the recording medium became 40° C. In addition, the curing heater of the printer was set so that the surface temperature of the recording medium became a secondary drying temperature shown in Table 6 below, followed by secondary drying (post-drying step). The term "solid pattern" means a pattern obtained by causing the ink to uniformly adhere to the recording medium so that an ink adhesion amount to be described later may be obtained.

Abrasion Resistance

Each of the inks was loaded into the reconstructed machine of the SC-R5050 as described above, and a solid pattern (ink adhesion amount: 12 mg/inch$^2$) was printed onto a recording medium. After the medium had been left to stand for 30 minutes at room temperature, its portion to which the ink had adhered was cut into a rectangle measuring 30 mm by 150 mm, and the extent to which the ink peeled when the portion was rubbed with a plain cloth dampened with water in a Gakushin-type rubbing tester (load: 500 g) 50 times was visually observed, and was evaluated by the following evaluation criteria. When the result of the evaluation is C or more, it can be said that satisfactory abrasion resistance is obtained.

Evaluation Criteria

AA: No peeling occurs.

A: Peeling corresponding to less than 20% of an evaluated area occurs.

B: Peeling corresponding to less than 50% of the evaluated area occurs.

C: Peeling corresponding to 50% or more and less than 80% of the evaluated area occurs.

D: Peeling corresponding to 80% or more of the evaluated area occurs.

Clogging Recoverability

After each of the inks had been loaded into the reconstructed machine of the SC-R5050, a nozzle surface of the machine was struck with BEMCOT dampened with water to intentionally cause a nozzle failure. Under the state, the machine was caused to idly run in an environment at 40° C. and 15% for 2 hours. After recording had been performed under the above-mentioned recording conditions, cleaning was performed three times, and the number of unrecovered nozzles was counted, and was evaluated by the following evaluation criteria. In one cleaning, 1 g of the ink was discharged from a nozzle group. The nozzle group includes two nozzle rows, that is, 800 nozzles. When the result of the evaluation is B or more, it can be said that satisfactory clogging recoverability is obtained.

Evaluation Criteria

AA: No misfiring occurs in the nozzles.

A: Misfiring occurs in less than 1% of the nozzles.

B: Misfiring occurs in 1% or more and less than 3% of the nozzles.

C: Misfiring occurs in 3% or more of the nozzles.

Thermal Deformation of Substrate

Each of the inks was loaded into the reconstructed machine of the SC-R5050 as described above, and a solid pattern (ink adhesion amount: 12 mg/inch$^2$) was printed onto a recording medium. The presence or absence of the deformation of the substrate of the resultant printed product was visually observed, and was evaluated by the following evaluation criteria.

Evaluation Criteria

A: No deformation of the recording medium occurs.

B: The deformation of the recording medium occurs, but is allowable.

C: The deformation of the recording medium occurs, and is not allowable.

3.4 Evaluation Results

The evaluation results are shown in Table 1 above and Table 6 below. The evaluation results of Table 1 show part of the evaluation results of Examples 1 to 20 and Comparative Examples 1 to 7 having the same composition except that the resin particles to be incorporated into the inks in the respective examples of Table 6 are different from each other.

TABLE 6

| | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|
| Ink | Ink A | Ink B | Ink C | Ink D | Ink E | Ink F | Ink G | Ink H | Ink I | Ink J | Ink K | Ink L | Ink M | Ink N |
| Secondary drying temperature | 70° C. | 70° C. | 70° C. | 70° C. | 70° C. | 70° C. | 70° C. | 70° C. | 70° C. | 70° C. | 70° C. | 70° C. | 70° C. | 70° C. |
| Abrasion resistance | A | A | B | C | A | AA | B | A | B | B | A | B | AA | A |
| Clogging recoverability | A | A | AA | AA | B | B | A | B | B | A | B | A | B | A |
| Thermal deformation of substrate | A | A | A | A | A | A | A | A | A | A | A | A | A | A |

| | Example 15 | Example 16 | Example 17 | Example 18 | Example 19 | Example 20 | Example 21 | Example 22 | Example 23 | Example 24 | Example 25 | Example 26 | Example 27 | Example 28 |
|---|---|---|---|---|---|---|---|---|---|---|---|---|---|---|
| Ink | Ink O | Ink P | Ink Q | Ink R | Ink S | Ink T | Ink U | Ink U | Ink V | Ink W | Ink X | Ink Y | Ink Z | Ink AA |
| Secondary drying temperature | 70° C. | 70° C. | 70° C. | 70° C. | 70° C. | 70° C. | 70° C. | 100° C. | 70° C. | 70° C. | 70° C. | 70° C. | 70° C. | 70° C. |
| Abrasion resistance | A | B | A | A | A | A | B | A | B | C | B | A | B | B |
| Clogging recoverability | A | A | A | A | A | A | B | B | A | A | A | B | AA | AA |
| Thermal deformation of substrate | A | A | A | A | A | A | A | B | A | A | A | A | A | A |

TABLE 6-continued

| | Example 29 | Example 30 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|---|
| Ink | Ink AB | Ink AC | Ink AD | Ink AE | Ink AF | Ink AG | Ink AH | Ink AI | Ink AJ | Ink AK | Ink AL | Ink AM | Ink AN |
| Secondary drying temperature | 70° C. | 70° C. | 70° C. | 70° C. | 70° C. | 70° C. | 70° C. | 70° C. | 70° C. | 70° C. | 70° C. | 70° C. | 70° C. |
| Abrasion resistance | AA | B | AA | AA | D | B | B | D | D | D | D | D | D |
| Clogging recoverability | B | A | C | C | A | C | C | C | C | C | AA | AA | A |
| Thermal deformation of substrate | A | A | A | A | A | A | A | A | A | A | A | A | A |

As a result of the evaluations, it was found that Examples that were each the following inkjet ink composition were each excellent in both of abrasion resistance and clogging recoverability: the inkjet ink composition was an aqueous ink including: the coloring material; the resin particles; and the water-soluble low-molecular weight organic compound, in which the water-soluble low-molecular weight organic compound contained 0.5 mass % to 9.0 mass % of the amide having a normal boiling point of from 215° C. to 290° C. with respect to the total mass of the ink composition, in which the resin particles were composite resin particles each formed of the first resin and the second resin that were acrylic resins, and in which when the root sum square δph of each of the first resin and the second resin was calculated from $\delta ph=\sqrt{(\delta p^2+\delta h^2)}$ where δp and δh represented the polar component and hydrogen-bonding component of the Hansen solubility parameters thereof, respectively, the δph1 of the first resin was from 4.0 $MPa^{1/2}$ to 4.8 $MPa^{1/2}$, and the δph2 of the second resin was more than 2.6 $MPa^{1/2}$ and less than 3.7 $MPa^{1/2}$. In contrast, Comparative Examples that were inkjet ink compositions different from that described above were each poor in one of abrasion resistance or clogging recoverability.

More specifically, as can be seen from the results of Examples 1 to 20, both of the abrasion resistance and the clogging recoverability were excellent in each of the various resin particles.

As can be seen from the results of Examples 1 to 6, when the mass ratio (first resin/second resin) of the first resin to the second resin fell within a predetermined range, the abrasion resistance and the clogging recoverability were particularly excellent.

As can be seen from the results of Examples 1 and 7 to 9, when the δph1 of the first resin and the δph2 of the second resin each fell within a predetermined range, and the acid value of the second resin fell within a predetermined range, the abrasion resistance and the clogging recoverability were particularly excellent.

As can be seen from the results of Examples 1, 10, and 11, when the resin particles were dispersed with the reactive surfactant, the abrasion resistance and the clogging recoverability were particularly excellent.

As can be seen from the results of Examples 1, 12, and 13, when the volume-average particle diameter of the resin particles fell within a predetermined range, the abrasion resistance and the clogging recoverability were particularly excellent.

As can be seen from the results of Examples 1 and 14 to 16, when the resin particles were neutralized with at least one of the organic amine or ammonia, the abrasion resistance and the clogging recoverability were particularly excellent.

As can be seen from the results of Examples 1 and 17 to 20, the abrasion resistance and the clogging recoverability were excellent in each of the resin particles using various reactive surfactants.

As can be seen from the results of Examples 1, 21 to 24, and 27 to 29, when the content of the water-soluble low-molecular weight organic compounds was equal to or less than a predetermined value with respect to the total mass of each of the inks, and the amount of the water-soluble low-molecular weight organic compound having a normal boiling point of 210° C. or less was equal to or more than a predetermined value with respect to the total mass of the water-soluble low-molecular weight organic compounds, the abrasion resistance and the clogging recoverability were particularly excellent.

As can be seen from the results of Examples 1, 25, and 26, the use of each of the various amides each having a normal boiling point of from 215° C. to 290° C. was able to make the abrasion resistance and the clogging recoverability excellent.

As can be seen from the results of Examples 21 and 22, as the temperature of the post-drying step became lower, the suppression of the thermal deformation of the substrate became more excellent. It was found from the foregoing that the ink composition of this embodiment was excellent because excellent abrasion resistance was obtained even when the temperature of the post-drying step was relatively low.

An evaluation was performed in the same manner as in Example 21 except that in Example 21, the surface temperature of the recording medium in the primary drying step was set to 35° C., though the result was not shown in any table. As a result, the evaluation result of the clogging recoverability was A, and some degree of image quality deterioration was observed in the pattern. It was found from the foregoing that the ink composition of this embodiment was excellent because excellent clogging recoverability was obtained even when the temperature of the primary drying step was relatively high.

In contrast, in each of Comparative Examples 1 to 7, one of the abrasion resistance or the clogging recoverability was poor because the δph1 of the first resin in each of the composite resin particles or the δph2 of the second resin therein deviated from the predetermined range.

It is assumed that the δph2 of the second resin in Comparative Example 4 was more than the predetermined range, and hence the dissolution of the resin particles advanced to result in poor clogging recoverability. It is assumed that the δph2 of the second resin in Comparative Example 5 was less than the predetermined range, and hence the hydrophilicity thereof was so low that the dispersion stability of the resin particles in water became poor to result in poor clogging recoverability.

In each of Comparative Examples 8 to 11, at least one of the abrasion resistance or the clogging recoverability was poor because the content of the amide having a normal boiling point of from 215° C. to 290° C. deviated from a predetermined range.

The following contents are derived from the above-mentioned embodiments.

According to one aspect of the present disclosure, there is provided an inkjet ink composition, which is an aqueous ink including: a coloring material; resin particles; and a water-soluble low-molecular weight organic compound. The water-soluble low-molecular weight organic compound contains 0.5 mass % to 9.0 mass % of an amide having a normal boiling point of from 215° C. to 290° C. with respect to a total mass of the ink composition. The resin particles are composite resin particles each formed of a first resin and a second resin that are acrylic resins. When a root sum square δph of each of the first resin and the second resin is calculated from $\delta ph=\sqrt{(\delta p^2+\delta h^2)}$ where δp and δh represent a polar component and a hydrogen-bonding component of Hansen solubility parameters thereof, respectively, a δph1 of the first resin is from 4.0 $MPa^{1/2}$ to 4.8 $MPa^{1/2}$, and a δph2 of the second resin is more than 2.6 $MPa^{1/2}$ and less than 3.7 $MPa^{1/2}$.

In the inkjet ink composition according to the one aspect, the composite resin particles may each have a phase-separated structure in which a phase formed of the first resin and a phase formed of the second resin are separated from each other, and the phase formed of the first resin may be included in the phase formed of the second resin.

In the inkjet ink composition according to any one of the above-mentioned aspects, a mass ratio (first resin/second resin) of the first resin to the second resin in each of the composite resin particles may be from 0.5 to 2.

In the inkjet ink composition according to any one of the above-mentioned aspects, a content of the water-soluble low-molecular weight organic compound may be 30 mass % or less with respect to the total mass of the ink, and a ratio of a water-soluble low-molecular weight organic compound having a normal boiling point of 210° C. or less to a total mass of the water-soluble low-molecular weight organic compound may be 50 mass % or more.

In the inkjet ink composition according to any one of the above-mentioned aspects, the composite resin particles may be resin particles dispersed with a reactive surfactant.

In the inkjet ink composition according to any one of the above-mentioned aspects, the reactive surfactant may be anionic.

In the inkjet ink composition according to any one of the above-mentioned aspects, the reactive surfactant may have an oxyalkylene group.

In the inkjet ink composition according to any one of the above-mentioned aspects, the composite resin particles may be soap-free type resin particles.

In the inkjet ink composition according to any one of the above-mentioned aspects, the composite resin particles may have a volume-average particle diameter of from 90 nm to 250 nm.

In the inkjet ink composition according to any one of the above-mentioned aspects, the composite resin particles may be resin particles neutralized with at least one of an organic amine or ammonia.

In the inkjet ink composition according to any one of the above-mentioned aspects, the composite resin particles may each have an acid value of from 5 mgKOH/g to 35 mgKOH/g.

In the inkjet ink composition according to any one of the above-mentioned aspects, the first resin and the second resin may each have a glass transition temperature of from 60° C. to 95° C.

In the inkjet ink composition according to any one of the above-mentioned aspects, the inkjet ink composition may further include 1 mass % or less of a surfactant that is free from being a dispersant for the resin particles.

According to one aspect of the present disclosure, there is provided a recording method, including an ink adhesion step of ejecting the above-mentioned inkjet ink composition from an inkjet head to cause the composition to adhere to a recording medium.

In the recording method according to the one aspect, the recording method may further include a post-drying step of heating the recording medium at from 50° C. to 110° C. after the ink adhesion step.

The present invention is not limited to the embodiments described above, and various modifications may be made thereto. For example, the present invention encompasses various other configurations substantially the same as the configurations described above in connection with the embodiments, for example, a configuration having the same function, method, and results, or a configuration having the same objective and effects. The present invention also encompasses a configuration in which an unsubstantial part of the configurations described above in connection with the embodiments is replaced by another configuration. The present invention also encompasses a configuration having the same effects as those of the configurations described above in connection with the embodiments, or a configuration capable of achieving the same objective as that of the configurations described above in connection with the embodiments. The present invention also encompasses a configuration in which a known technique is added to the configurations described above in connection with the embodiments.

What is claimed is:

1. An inkjet ink composition, which is an aqueous ink comprising:

a coloring material;

resin particles; and a water-soluble low-molecular weight organic compound, wherein the water-soluble low-molecular weight organic compound contains 0.5 mass % to 9.0 mass % of an amide having a normal boiling point of from 215° C. to 290° C. with respect to a total mass of the ink composition, wherein the resin particles are composite resin particles each formed of a first resin and a second resin that are acrylic resins, wherein when a root sum square δph of each of the first resin and the second resin is calculated from δph=V ($\delta p^2+\delta h^2$) where δp and δh represent a polar component and a hydrogen-bonding component of Hansen solubility parameters thereof, respectively, δph1 of the first resin is from 4.0 $MPa^{1/2}$ to 4.8 $MPa^{1/2}$, and a δph2 of the second resin is more than 2.6 $MPa^{1/2}$ and less than 3.7 MPa1 $MPa^{1/2}$;

wherein the composite resin particles each have a phase-separated structure in which a phase formed of the first resin and a phase formed of the second resin are separated from each other, and the phase formed of the first resin is included in the phase formed of the second resin; and wherein a mass ratio, first resin/second resin, of the first resin to the second resin in each of the composite resin particles is from 1/1.3 to 1/0.7.

2. The inkjet ink composition according to claim 1, wherein the composite resin particles are either resin particles having a core-shell structure in which the first resin is a core portion and the second resin is a shell portion, or resin particles each having a sea-island structure in which the first resin is an island and the second resin is a sea.

3. The inkjet ink composition according to claim 1, wherein the mass ratio (first resin/second resin) of the first resin to the second resin in each of the composite resin particles is from 1 to 1/0.8.

4. The inkjet ink composition according to claim 1, wherein a content of the water-soluble low-molecular weight organic compound is 30 mass % or less with respect to the total mass of the ink, and a ratio of a water-soluble low-molecular weight organic compound having a normal boiling point of 210° C. or less to a total mass of the water-soluble low-molecular weight organic compound is 50 mass % or more.

5. The inkjet ink composition according to claim 1, wherein the composite resin particles are resin particles dispersed with a reactive surfactant.

6. The inkjet ink composition according to claim 5, wherein the reactive surfactant is anionic.

7. The inkjet ink composition according to claim 5, wherein the reactive surfactant has an oxyalkylene group.

8. The inkjet ink composition according to claim 1, wherein the composite resin particles are soap-free type resin particles.

9. The inkjet ink composition according to claim 1, wherein the composite resin particles have a volume-average particle diameter of from 90 nm to 250 nm.

10. The inkjet ink composition according to claim 1, wherein the composite resin particles are resin particles neutralized with at least one of an organic amine or ammonia.

11. The inkjet ink composition according to claim 1, wherein the composite resin particles each have an acid value of from 5 mgKOH/g to 35 mgKOH/g.

12. The inkjet ink composition according to claim 1, wherein the first resin and the second resin each have a glass transition temperature of from 60° C. to 95° C.

13. The inkjet ink composition according to claim 1, further comprising 1 mass % or less of a surfactant that is free from being a dispersant for the resin particles.

14. A recording method, comprising an ink adhesion step of ejecting the inkjet ink composition of claim 1 from an inkjet head to cause the composition to adhere to a recording medium.

15. The recording method according to claim 14, further comprising a post-drying step of heating the recording medium at from 50° C. to 110° C. after the ink adhesion step.

* * * * *